United States Patent [19]

Tsai

[11] Patent Number: 5,655,164

[45] Date of Patent: Aug. 5, 1997

[54] STILL FILM SOUND PHOTOGRAPHY METHOD AND APPARATUS

[76] Inventor: Irving Tsai, 435 E. 70th St., New York, N.Y. 10021

[21] Appl. No.: 500,309

[22] Filed: Jul. 6, 1995

Related U.S. Application Data

[63] Continuation-in-part of Ser. No. 996,003, Dec. 23, 1992, abandoned.

[51] Int. Cl.$^6$ ................................................ G03B 17/24
[52] U.S. Cl. ........................................ 396/312; 396/315
[58] Field of Search ........................ 354/75, 76, 105, 354/106; 352/11, 27, 37; 396/310, 311, 312–315, 319

[56] References Cited

U.S. PATENT DOCUMENTS

| | | | |
|---|---|---|---|
| 3,001,444 | 9/1961 | Castedello et al. | 354/106 |
| 3,046,836 | 7/1962 | Schwartz et al. | 354/106 |
| 3,230,824 | 1/1966 | Schwartz et al. | 364/106 |
| 3,379,095 | 4/1968 | Kaprelian | 354/106 |
| 3,691,312 | 9/1972 | Petersen | 354/76 |
| 4,461,552 | 7/1984 | Levine | 352/27 |
| 4,600,280 | 7/1986 | Clark | 352/37 |
| 4,905,029 | 2/1990 | Kelley | 354/76 |
| 4,983,996 | 1/1991 | Kinoshita | 354/76 |
| 5,006,873 | 4/1991 | Wash | 354/106 |
| 5,128,700 | 7/1992 | Inoue et al. | 354/76 |
| 5,245,373 | 9/1993 | Ogawa et al. | 354/106 |
| 5,363,157 | 11/1994 | Cocca | 354/76 |

*Primary Examiner*—David M. Gray
*Attorney, Agent, or Firm*—Weil, Gotshal & Manges LLP

[57] ABSTRACT

A system for incorporating electronic signals representative of at least audio information into still film slides and photographs. A data storage medium capable of retaining electronic signals is provided in association with a photographic print or frame in which a slide is mounted. Audio information is stored in the data storage medium and may be aurally reproduced by an audio reproduction device as the slide or photograph is being displayed. The system affords bi-directional compatibility with the existing art.

11 Claims, 16 Drawing Sheets

"Hi mom, it's me...Tara."

FIG. 3
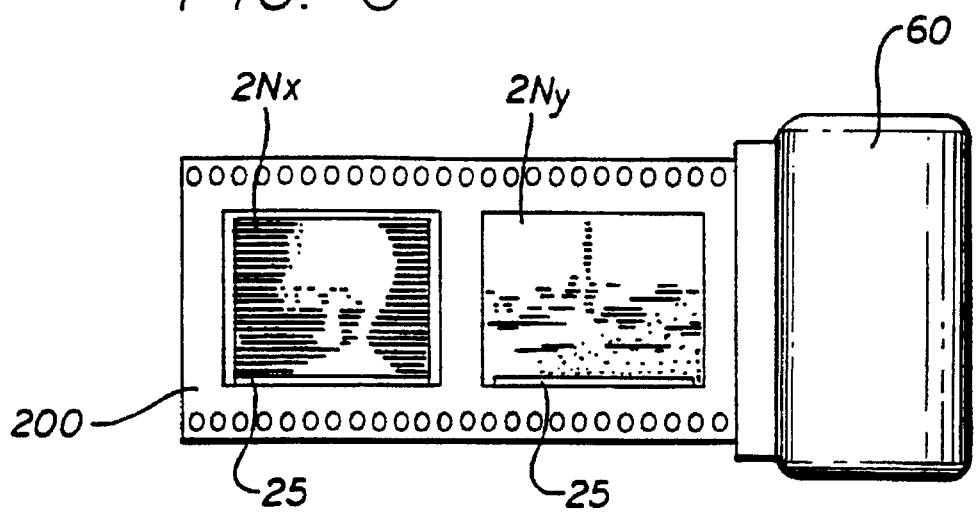
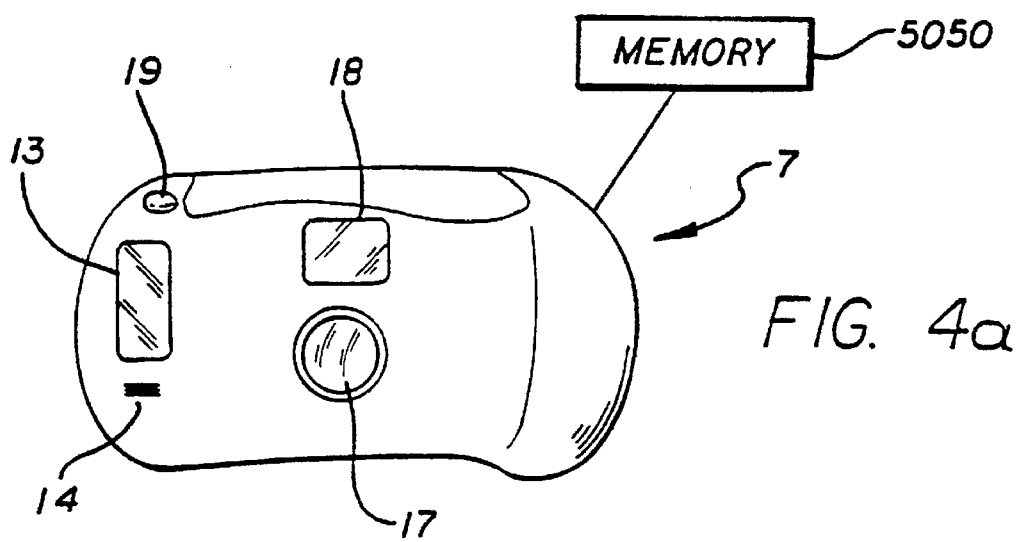
FIG. 4a
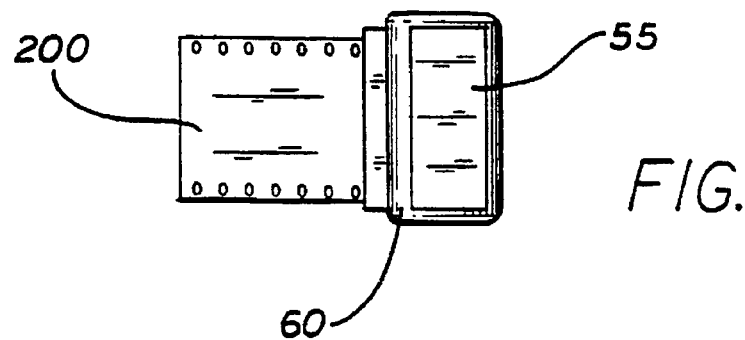
FIG. 4b

"The Mancula Densa is composed of tall columnar cells."

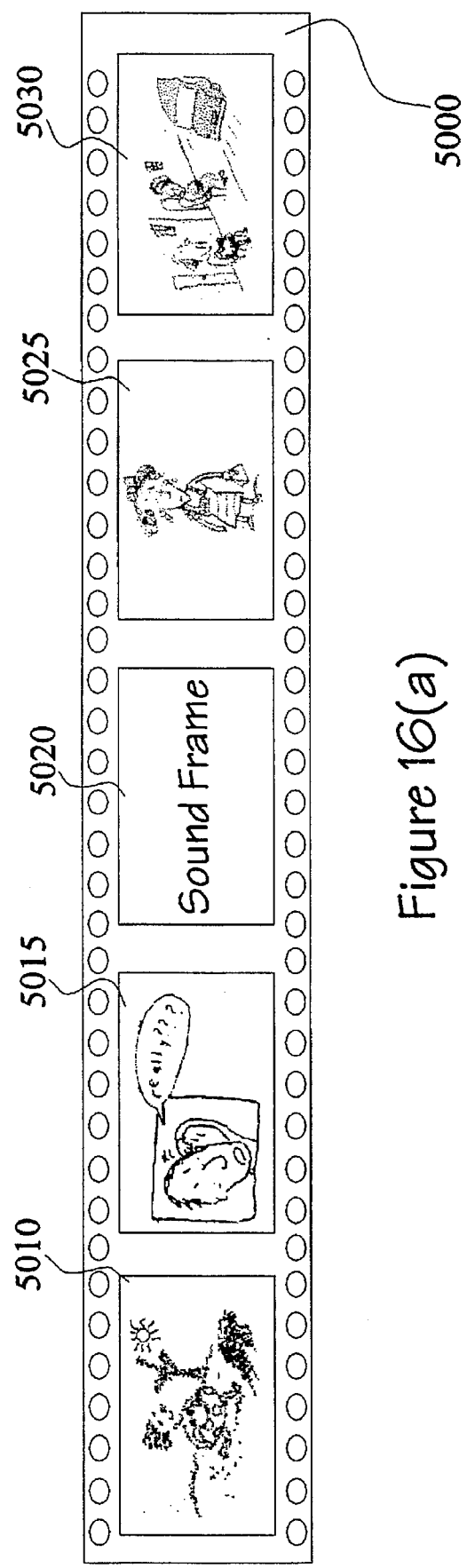

STILL FILM SOUND PHOTOGRAPHY METHOD AND APPARATUS

This application is a continuation-in-part of application Ser. No. 07/996,003, filed Dec. 23, 1992, now abandoned.

BACKGROUND OF THE INVENTION

1. Field of the Invention

The present invention relates to a method and apparatus for incorporating electronic signals representative of at least audio information into still film photographs, such as slides and prints.

The present invention is directed at achieving this objective in a manner which preserves compatibility with current art photographic equipment and processing. It is further directed at providing an upgrade pathway from the existing art to the newly introduced art that ordinary persons, such as amateur photographers, can implement on their own. It is still further directed at accomplishing the above identified objectives in a simple and economical fashion. Finally, a new generation of photographic viewing and projecting devices is presented.

2. Description of Related Art

Known in the art are electronic still video cameras which capture images onto video floppy discs. Some versions of these cameras are equipped to record sound. Still video cameras, as their name implies, are essentially "one frame at a time" variations of ordinary video cameras. Moreover, they do not make use photographic film. Also known in the art are numerous techniques for incorporating sound into motion picture film. The present invention, however, relates primarily to still film photography.

It is an object of the present invention to provide optional, on-demand sound capability in a still film camera while preserving, to the fullest extent possible, existing formats and practices used in the art of ordinary still film photography.

SUMMARY OF THE INVENTION

The present invention enables still film photography to include sound. Furthermore, the present invention accomplishes the addition of sound in a manner that involves minimal modifications to existing apparatus; and enables preservation of existing processing procedures. Ordinary film manufactured using prior art techniques may continue to be used. Likewise, film constructed specifically for use with cameras designed for "Sound Photography" may also be used by conventional cameras. Bi-directional compatibility is thus maintained. In addition to these benefits, the present invention preserves the "look and feel" of conventional photographic slides and prints.

There are a variety of methods which may be employed to store electronic signals representative of at least audio information in a fashion compatible with the objectives of this invention. The ones discussed below are thus to be viewed as illustrative of the general principles involved, rather than as limiting.

In a preferred embodiment, a "Data Strip" is provided on a (developed) slide or print, and may be located at any convenient position on the slide or print. Possible positions for the Data Strip may be the cardboard (or plastic) slide mount of a slide; the back surface of a print; or, for a Polaroid print, either the rear surface, or else the basal margin on the face of the Polaroid print. Whereas the term "Strip" is being used to refer to one form of a data storage means used by some embodiments for storing electronic signals representative of at least audio information, it is not a requirement for such storage means to appear in the geometric form of a strip. It is possible for the data storage means to be fashioned into any of a multiplicity of shapes, including a rectangular patch. As would be appreciated by skilled artisans, the total surface area of (for instance) a Data Strip or Data Patch, along with the storage density of the Strip or Patch, may affect the amount of data that can be stored in it. While the Data Strip typically may be used to retain electronic data representative of audio information, it may also be used to store control codes, for instance, used to control exposure settings on a camera, or to control the operation of a projector. Data Strips may be comprised of any of a variety of types of storage media. They may be comprised of magnetic media similar to the kind used in audio or video tape. They may be constructed of optical media similar to those employed in optical storage devices such as ones used by computers. Or, they may equally be comprised of a semiconductor memory such as, for example, a WORM, PROM or ROM. Another technique, and certainly not the final one, involves storing the electronic signals on the photographic emulsion using optically encoded variations in light intensity. With this option, auxiliary data retention means, such as data strips and patches, may not be required.

Cameras in accordance with the present invention include means for inputting audio information, such as a microphone. The cameras also include means for storing or for otherwise retaining the audio information that they collect. The audio information may be transferred in a later step to a data strip, or, may be saved in a data strip immediately following input by the microphone in a continuous process step. In camera embodiments in which audio information is first saved in a temporary memory for later transfer to a data strip, a memory medium for the temporary memory is required. The temporary memory medium may be any medium capable of providing storage for electronic signals. It may also be the photographic emulsion itself. The temporary memory may comprise a magnetic medium, an optical medium, a semiconductor memory, etc. In embodiments where the temporary memory medium is included in the camera, the memory may be of the erasable variety. In embodiments in which the audio information is first saved in a temporary memory, a data strip recorder may also be required. The data strip recorder is used to transfer electronic information saved in the temporary memory of a camera onto the data strips which are affixed to slides and prints.

The "Talking Slides & Prints" described herein are "played" using Players that include means for accessing the data storage media which contain the electronic signals representative of the audio information. The particular accessing means involved may depend on the actual method implemented for data storage, but may utilize components and means similar to those practiced in audio tape players, computer disk drives, random access memory read circuits, etc. In some embodiments such as those where the data strip comprises an optical memory, the slide players may be capable of multimedia presentations that include computer generated audio and video sequences, conventional audio/video passages, etc. in addition to the customary projected photographic images. The players may also be capable of giving automated slide presentations, wherein the presentations are "directed" by control codes contained in the slides. Not only may the players (and projectors) themselves be controlled in this manner, but other devices to which the players are connected as well, such as computers, audio components, video components, other A/V presentation devices, etc.

BRIEF DESCRIPTION OF THE DRAWINGS

A detailed description of the preferred embodiments of the present invention will be made with reference to the accompanying drawings.

FIG. 3 shows an example of data being stored on a photographic emulsion in the same frame with a photographic image.

FIG. 4 shows an example of data storage means included in a camera and a film canister.

FIG. 16(a)–(c) illustrate one embodiment of applicant's invention where sound information is stored on frames following the associated picture.

DESCRIPTION OF THE PREFERRED EMBODIMENT

The following detailed description is of the best presently contemplated mode of carrying out the present invention. This description is not to be taken in a limiting sense, but is made merely for the purpose of illustrating the general principles of the invention. The scope of the invention is best defined by the appended claims.

Figure 1A:
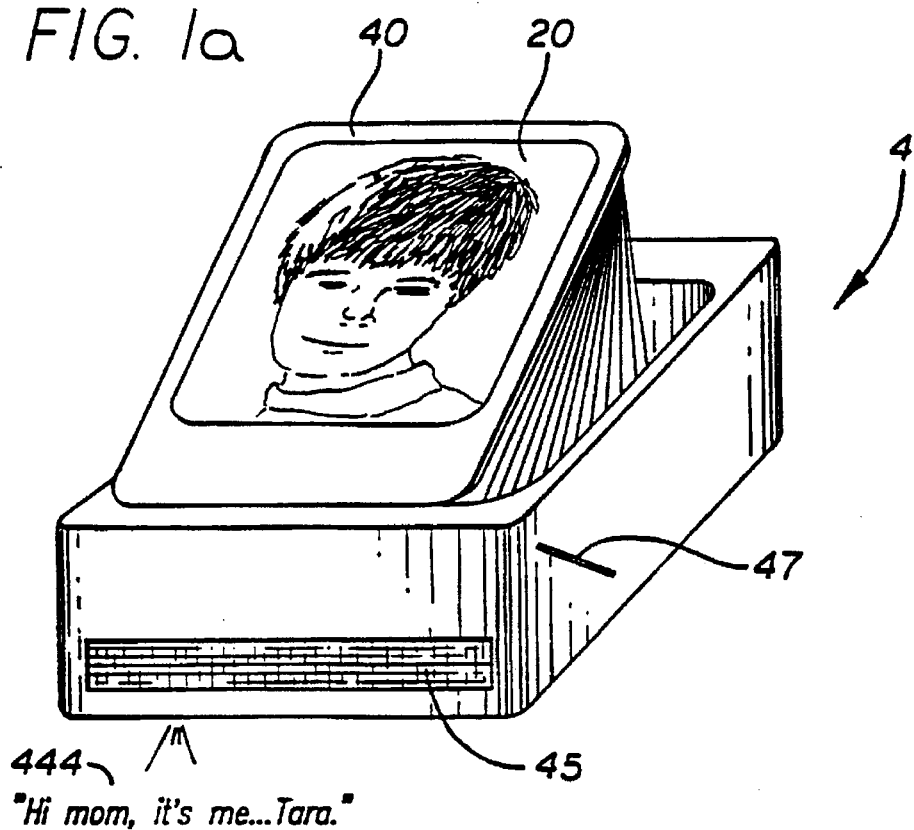
FIG. 1 shows an example of a still film photographic "Slide Player" and of the slides they play which include audio information. The "Slide Player" shown is also capable of playing conventional slides; and similarly the slides shown are capable of being viewed using conventional slide viewers.
Figure 1B:
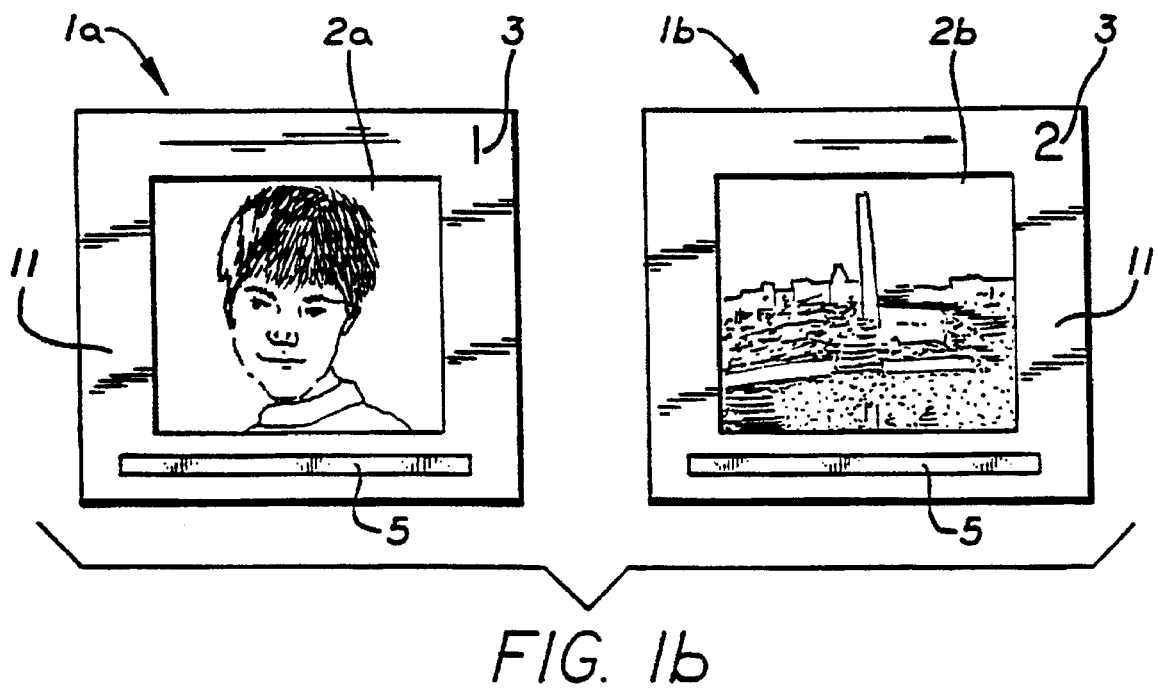

FIG. 1 illustrates how an embodiment of the present invention enables otherwise conventional photographic slides to include audio information. FIG. 1 illustrates a slide "Player" 4 and two slides 1A and 1B which may be "played" by the slide "Player" 4. The slides 1A and 1B have slide numbers 3 associated therewith, as is customary in the art. The slides 1A and 1B also have mounts 11 which may typically be constructed of cardboard or plastic. The mounts 11 furnish mechanical support for the photographic emulsions 2A and 2B. The aforementioned components are typical elements of still film photographic slides.

The example of the present invention illustrated in FIG. 1 utilizes a data strip 5 comprised of an electronic data storage medium. The data Strip 5 is used to retain electronic signals representative of at least audio information. The Data Strip 5 may be comprised of a magnetic recording medium similar to magnetic recording tape. It may also be comprised of a magnetic recording medium such as those used in magnetic diskettes. Alternatively, the Data Strip may employ an optical recording medium or semiconductor memory. Indeed a wide margin of variation is possible with regard to electronic data storage media applicable to the objectives of the present invention. It is preferable, however, that the "look and feel" of conventional photographic slides (and prints) be substantially preserved. The strip is provided on the mounting frame 11 of the slide 1, and may be manufactured onto the frame or applied to the frame by, for example, the person taking the photograph. In the latter case the data strip may be furnished with an adhesive backing to facilitate application to the slide. Slide Player 4 possesses a slide insertion slot 47 into which slides to be played may be inserted. A loudspeaker 45 is also provided for aurally reproducing the audio information read from the data strip 5 of the slide. Slide Player 4 is also furnished with display means 40 onto which images may be displayed—for instance, projected. In FIG. 1 the image 2A of slide 1A is projected onto display means 40 of slide player 4 as image 20. The audio information 444 is demonstrated being played by loudspeaker 45 of player 4. In the illustration the audio information 444 comprises the message: "Hi mom, it's me . . . Tara!" The slide player 4 may also be used to display conventional slides. In embodiments where slides having data storage means are substantially the same, with respect to physical dimensions, as conventional photographic slides, slides such as 1 may be viewed using ordinary slide viewers and projectors. In this latter instance, however, the novel features afforded by the present invention would not be available to conventional viewing or projecting equipment.

Although FIG. 1 depicts the role of the data strip 5 in storing electronic signals representative of audio information, the data strip is by no means limited to storing just audio information. Indeed, any type of information which may be retained in an electronic data storage medium may be placed into the data strip 5. For example, control codes used to control slide projector operation may be placed into a data strip to permit preprogrammed, automated slide shows to be given by the projector. Such automated slide shows can include audio information, video information, and even computer generated animations and A/V sequences. Moreover the projector may be capable of controlling other devices to which it may be connected. Because the data strip is physically associated with the slide, any information contained in a data strip will accompany the slide wherever it may go. Automated slide shows may thus be integrally constituted with the slides themselves.

Figure 2A:
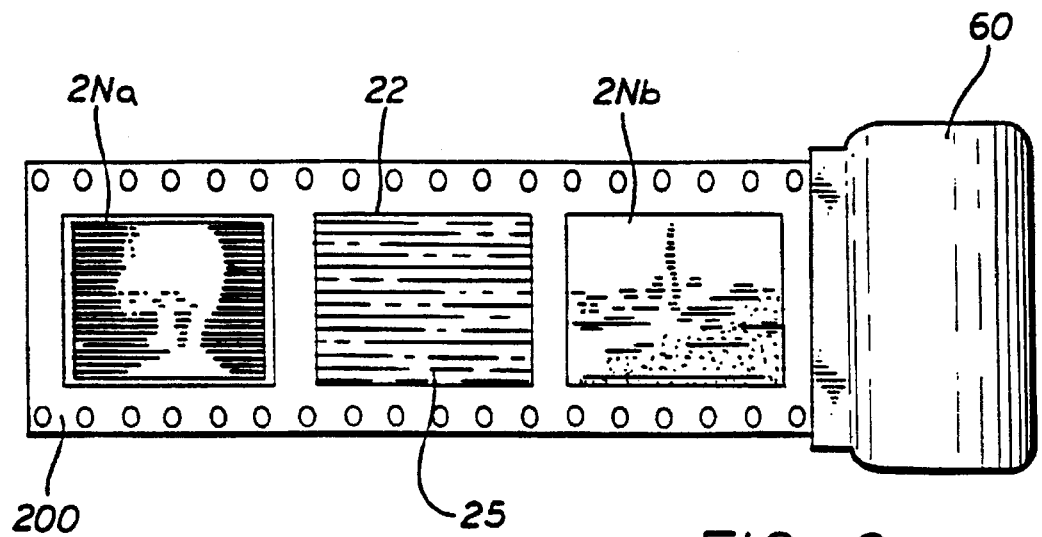
FIG. 2 shows an example of data storage means which may be used to incorporate data representative of at least audio information into still film photographic slides.
Figure 2B:
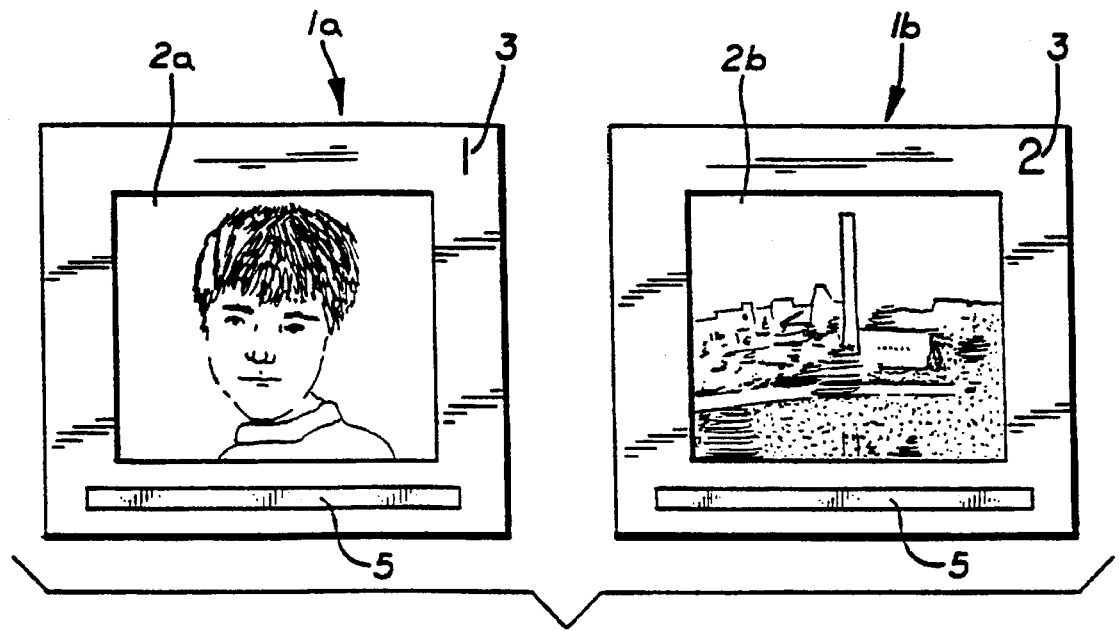
Figure 14:
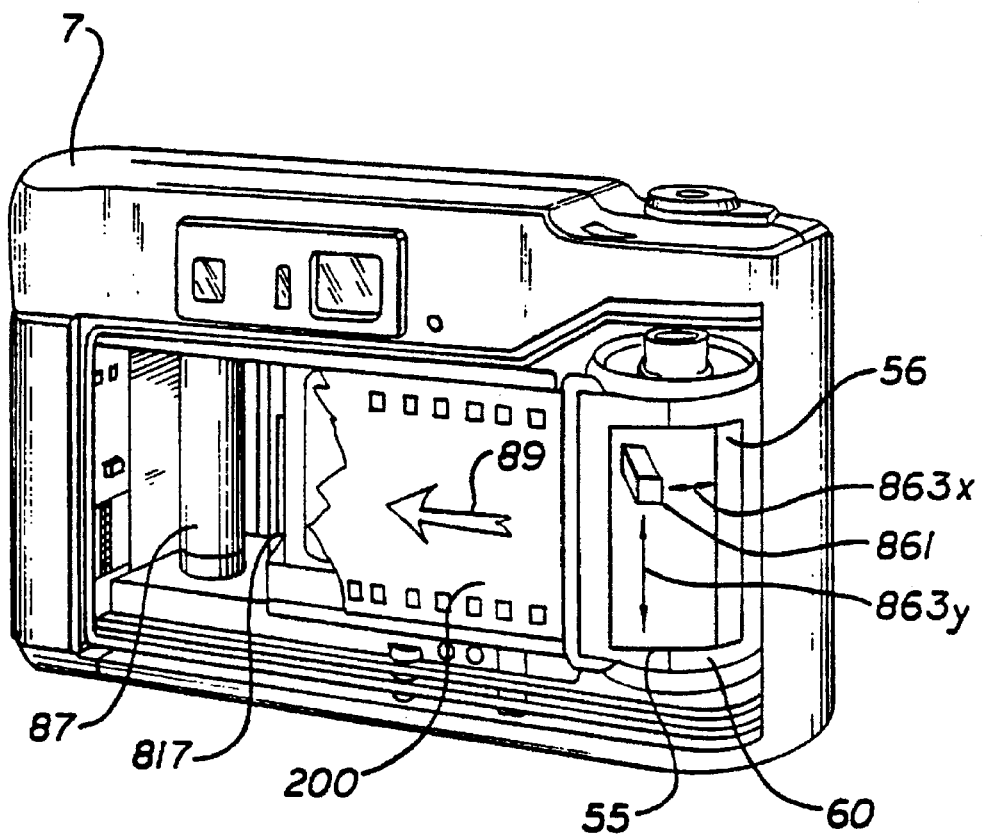
FIG. 14 shows an example of a camera that includes a Magnetic Write Head and an Optical Write Head for Sound Photography.

FIG. 2 illustrates an embodiment of the invention in which the electronic signals representative of at least audio information are stored on the photographic film itself, such as optically in the emulsion. In the figure, 60 represents a roll of photographic film such as a roll of conventional 35mm film. 200 denotes the actual film itself. Three exposed frames may be seen on the film 200. Frame 2Na corresponds to image 2a of slide 1a in FIG. 2. Frame 2Na is the negative of image 2a. Similarly frame 2Nb is the negative of the image 2b seen mounted in slide 1b in the figure. Frame 22 illustrates a "Data Frame" that contains optically encoded electronic information representative of, for instance, audio signals. Frame 22 is shown to be comprised of a plurality of parallel tracks 25 of varying optical density. The variations in optical density in the tracks 25 are used to encode for information stored in the Data Frame 22. Techniques of optical encoding and for storing information in optical media are well known in the art, and would be within the purview of skilled artisans. The tracks 25 may be written by a semiconductor laser onto the emulsion of film 200, in frame 22. The semiconductor laser may be included in the camera. This is illustrated in FIG. 14 wherein the Optical Write Head of a semiconductor laser assembly is shown as element 817. The information contained in the Data Frame 22 may be read, for instance, after the roll 60 has been developed. It may then transferred to a Data Strip 5. As described above, the Data Strip 5 may be comprised of a variety of electronic data storage media, including a magnetic or optical recording medium. It may also comprise a semiconductor memory, such as a ROM, WORM, PROM, or other variety of nonvolatile semiconductor memory. In fact, any suitable form of electronic data storage medium capable of retaining electronic signals representative of, for example, at least audio information, may be applicable. The objective is plainly to enable an otherwise conventional still film photographic slide or print to retain electronic information. In the case of FIG. 2, Data Frame 22 contains the optically encoded signals for the audio passage: "Hi mom, it's me ... Tara." Similarly, Data Strip 5 of slide 1a contains this information. Thus, when slide 1a is inserted into slide player 4 of FIG. 1, loudspeaker 45 of player 4 will aurally reproduce the message 444: "Hi mom, it's me ... Tara." The visual portion of the slide 1a is displayed on display means 40 as image 20. In the event that video information is also present in Data Strip 5, display means 40 may also display this video information, whether concurrently with the display of the photographic image 2a as two superimposed (e.g. projected) images, or apart from it.

FIG. 3 illustrates an embodiment of the invention in which electronic signals representative of audio information have been optically encoded and recorded on the same frame as the photographic images with which they are associated. A roll of photographic film is depicted as 60 in the figure. On the film 200 can be seen two frames 2Nx and 2Ny, which are the negatives of the images 2a and 2b of slides 1a and 1b, depicted in FIGS. 1 and 2. Data tracks 25 of optically encoded information are shown at the bottom of frames 2Nx and 2Ny. The data tracks illustrated are similar to those present in Data Frame 22 of FIG. 2, except that in this embodiment they are written on the same frame as the photographic images with which they are associated. While storing data in the same frame as the images they are connected with has the advantage of conserving film, it is preferable for separate Data Frames be employed when data is to be written directly onto film.

FIG. 4 illustrates embodiments of the invention in which the electronic signals representative of audio information are not written as optically encoded data onto film. One technique, shown in FIG. 4b, involves the use of an electronic data storage medium provided on the photographic film canister. In FIG. 4b 60 is a canister of film 200. Provided on canister 60 is an electronic data storage medium 55 used for storing electronic information. The electronic data storage medium 55 may be manufactured onto the canister 60. It may equally be affixed to the canister 60 by, for example, an ordinary person who intends to use the roll of film. The present invention thereby permits unskilled individuals untrained in the photographic sciences to modify a conventional, prior art roll of film such that it may be used by a camera equipped, in accordance with the present invention, for Sound Photography. Moreover, the techniques of the present invention permit a seamless transition from current art photographic equipment and processing to the novel apparatus and methods described herein. Cameras constructed for Sound Photography in accordance with the present disclosure may use film either fabricated similarly in accordance with this disclosure, or with equal facility, film that has not been so constructed. In reciprocal fashion, prior art cameras not manufactured with the present invention in mind may nonetheless employ film that has been manufactured (or modified) based on the present invention. In the latter example, however, the advantages afforded by the instant invention would be lost.

The electronic data storage medium 55 in FIG. 4b may comprise a magnetic recording medium similar to magnetic tape or to the magnetic media of computer diskettes. It may also comprise an optical data storage medium of either the rewritable or write-once variety. The choice of data storage medium will affect the information storage density and hence the amount of information that may be retained by it. These considerations are appreciated by skilled artisans. Electronic information contained in 55 may be used to control a camera, a special purpose photographic apparatus, or a device to which the apparatus containing the film is connected. In embodiments where the data storage medium 55 are to be affixed to the film canister 60 by an end-user, the medium may be provided with an adhesive back-coating. In some embodiments of data media 5S, additional layers or coatings may be included to reduce static electricity, to impede the flow of electrical current, or to retard the transfer of heat, etc. in order to protect the film from any adverse effects which may arise during media-write operations. The precise duty of these supplemental layers would depend on the specific photographic environment involved, because media such as 55 may equally be used with "unconventional" forms of photographic film such as X-ray or infrared film. Indeed storage media as well as any supplemental (e.g. protective) layers may be fabricated directly into the film.

FIG. 4a illustrates one embodiment of a camera that has been constructed in accordance with the present invention to facilitate the incorporation of sound into film-based, still photography. The camera 7 includes the usual components found in cameras such as a lens 17, viewfinder 18, shutter release button 19, and flash lamp 13. The camera 7 also includes a microphone 14 to provide means for inputting audio information. As will be discussed below in greater detail in connection with FIG. 13, the microphone 14 may play a number of different roles in the operation of the camera 7. For example, depression of the shutter release button 19 may simultaneously trigger an exposure sequence and an audio recording sequence, causing a photograph to be captured on film 200 and concurrently, acoustic data to be gathered by microphone 14 and recorded. In another mode of operation it is also possible for the photographic exposure sequence to be initiated by an acoustic input that satisfies a preprogrammed condition. For instance, an audio input above a preset volume level may serve to trigger the exposure sequence. In yet another mode of operation an audio input that matches a preset acoustic pattern may serve as the trigger. For example, the trigger may comprise an acoustical pattern match for the preset acoustic pattern "Ready", as spoken by a photographer. The microphone 14 may thus substitute for the shutter release button 19 as the trigger for exposure initiation.

Also illustrated in FIG. 4a is a memory 5050 included in camera 7. The memory unit 5050 may comprise any kind of storage element capable of being incorporated into, or else included with, the camera 7 that may serve to store, or to otherwise retain, electronic information. Memory unit 5050 may be a semiconductor memory (505). It may also comprise an electronic data storage device (50) such as a micro disk drive or tape recorder. Indeed, it may include any of a sizable variety of storage device types capable of furnishing storage means for electronic signals representative of at least audio information.

Figure 5:
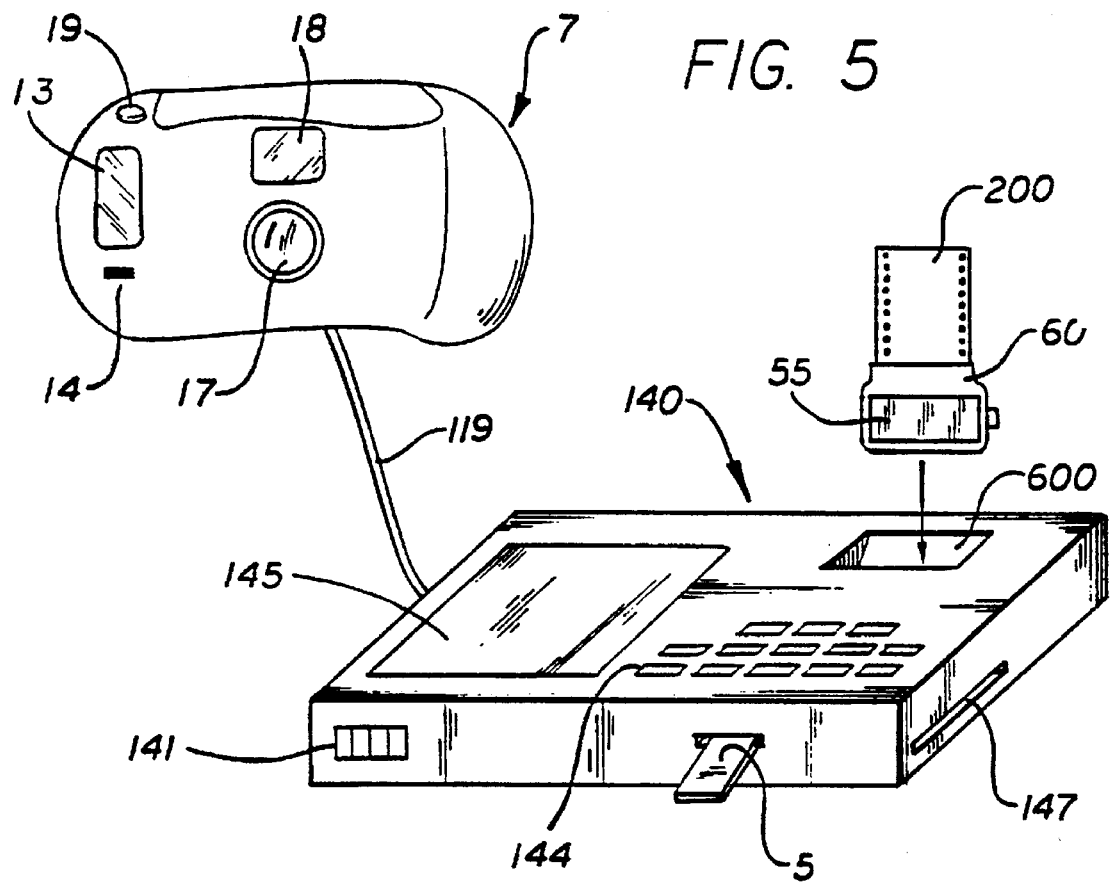
FIG. 5 shows an example of a recording apparatus which may be used with a camera, film canister, slide, or Data Strip.

FIG. 5 illustrates a Data Strip Recorder 140 that may be used to create Data Strips 5 for application to slides 1. In FIG. 5 a camera 7 is shown connected to the Data Strip Recorder 140 by an electrical connector 119. In embodiments of the invention in which the audio information is stored in a memory 5050 included in the camera 7, the audio data may be transferred to Data Strips 5 by way of downloading the information into the strip recording apparatus 140. The recording apparatus 140 then generates the strips 5. In embodiments where the data strip 5 is comprised of a magnetic recording medium similar to magnetic audio tape, the recording apparatus 140 may include components similar to ones included in audio tape recorders, for instance, a magnetic Read/Write Head. The strips 5 thus produced by the strip recorder 140 may subsequently be applied to slides and prints by ordinary persons, such as amateur photographers. The data strips 5 may incorporate a magnetic recording medium, an optical recording medium, a semiconductor memory, etc. Indeed they may comprise any kind of storage medium or element that may be affixed to, or provided in association with, a photographic slide or print in such manner as to substantially preserve the "look and feel" of the otherwise conventional slide or print, while furnishing data storage means. The choice of storage medium employed would affect the information storage density and capacity of the strip, as well as the hardware required to store and to retrieve data from the strip. These considerations are, however, well known in the mature art of storage device design and implementation. For example, where the data strip is comprised of a magnetic recording medium, a read/write head similar to those found in current art tape recording equipment might be employed.

The strip recorder 140 also includes a loudspeaker 145 and a microphone 141. These enable audio information to be aurally reproduced as well as input by the unit 140. Loudspeaker 145 permits audio data stored in memory 5050 of camera 7 to be played, once the camera 7 has been connected to the Data Strip Recorder 140 by connector 119. The microphone 141 enables audio information to be newly introduced by the recording unit 140 into a data strip 5, in instances where an audio passage was not recorded by the camera 7. It also facilitates modifications to audio passages recorded earlier. As examples, an erroneous memo is dictated into the camera 7 at the time a photograph is taken, such as "The Louvre", when the structure photographed was actually the Versailles Palace. Later, when the Data strip is being generated using data strip recorder 140 a new Data Strip may be recorded with the identifying memo "The Versailles Palace". Or, when a photograph is taken an audio passage is recorded by the camera saying: "Mary Yvonne Daniel". The passage may be altered afterwards using the recorder 140 to: "Mary Yvonne Daniel JoAnne". The preceding are but two examples.

In embodiments where the Data Strip is permanently affixed onto a slide (i.e. by the developer), the audio information associated with such a slide may be modified or re-recorded by insertion of the slide into the slide receiving means 147 of the strip recorder 140. Using microphone 141 and controls 144 included with strip recorder unit 140, new audio data may be created and written onto a data strip already present on the slide. Similarly, existing audio information may be edited or modified.

Also illustrated in FIG. 5 is a receiving member 600 for receiving entire rolls of film 60, and which includes means for reading and writing electronic information contained in data patches 55 provided on the film canisters. As illustrated in connection with FIG. 4b, audio passages associated with photographic images may be saved on film canisters 60, where they may be retained in data patches like 55. When audio information is thus stored in data patches provided on, or user-affixed to, film canisters, the audio data may be recovered and transferred to data strips 5 using the data strip recorder 140. When a canister of film 60 is placed into the receiving member 600 of the recorder 140, the information contained in the data patch 55 may be read by a Read Head included in the receiving member 600 and written onto data strips 5. The audio information, whether contained in data patches 55 on canisters of film, or written onto the film emulsion as optically encoded signals, may be transferred to data storage means provided on developed slides or prints by the photographic developer. It is not a requirement of the present invention for the audio information be placed onto developed slides and prints by the end-user. Also, whereas data patches 55 are presented herein as a potential means for the storage of electronic signals representative of, for example, audio information, they are not a requirement in the restrictive sense. Film canisters and the film itself, to mention but two possibilities, may be manufactured to include data storage means. It is also possible for data strip cassettes to be loaded into a camera along with rolls of film, such that the camera may generate the data strips containing audio information in situ. These additional configurations exhibit but a few of the possible system permutations embraced by the present invention.

The strips 5 produced by any of the above-suggested methods may then be affixed to the slide mounts 11 of slides 1. Similarly, they may be affixed to the backs of photographic prints, or of Polaroid prints. The locations mentioned herein are for illustrative purposes only. By all means any suitable and convenient position on a slide or print may be selected for application of data strips or patches. In FIG. 5 the roll of film 60 is depicted as being a new, or as yet unexposed, roll of film. A "leader" segment of film 200 is thus depicted as being present in the diagram. In practice, it will be typical in most cases for the roll of film 60 to be a used, or "exposed" roll. "Exposed" rolls of film may not have leader segments protruding from the film canister. An unexposed roll of film, however, may be used in connection with recorder unit 140 in instances where camera control codes or voice memos are to be recorded onto data patches 55. Camera control codes allow rolls of film to convey exposure control instructions, used to operate a camera, to the camera via the roll of film itself. This may be useful in certain scientific applications where synchronized exposure settings may be desired. Examples of such applications may be astrophotography or photomicroscopy. Voice memos may also be incorporated into rolls of film. Voice memos may be, but are not limited to, messages such as: "Don't forget to take pictures of the Vatican!" It is also possible for voice memos to be retained in memory units (such as 5050)

included with the camera, in camera embodiments where such memories are present. However, the advantage of placing voice memos with the film is that this allows the messages to follow the film. Photographers often prepare a number of rolls of film in advance for their shooting purposes. Where more than one camera is being carried along with the film, it may sometimes be more convenient to keep the memos with the film.

Figure 6:
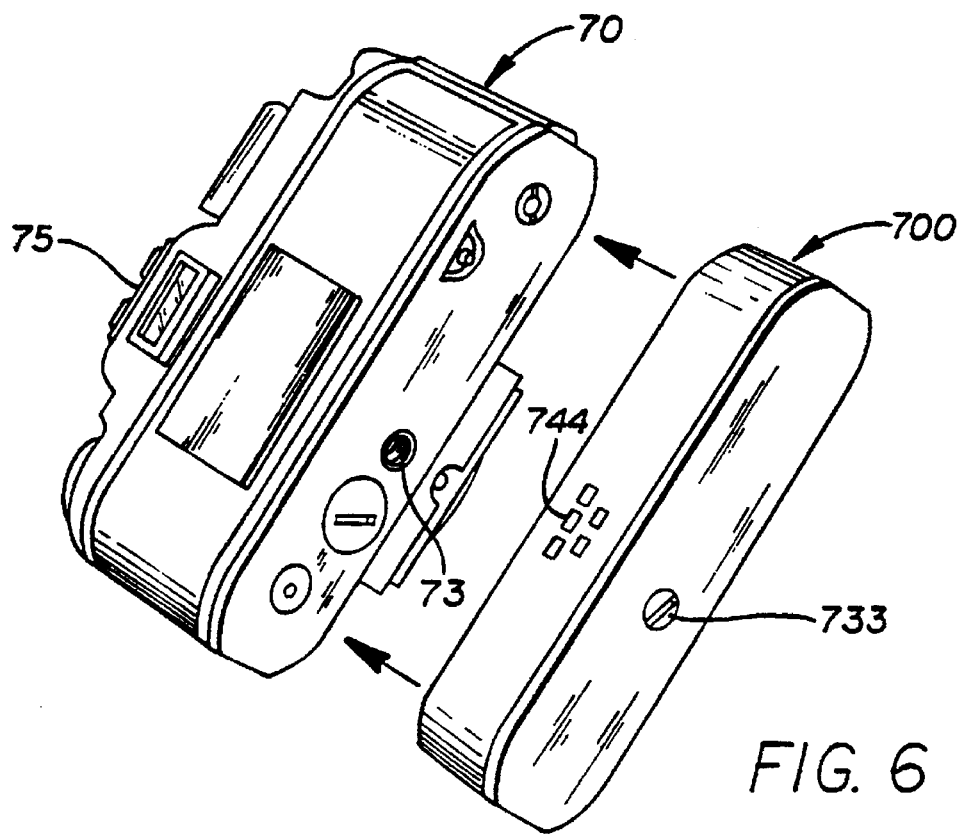
FIG. 6 shows an example of an adapter for enabling an otherwise conventional still film photographic camera to incorporate sound into otherwise conventional still film photographs.

FIG. 6 illustrates one embodiment of an adapter which enables a camera not designed to be audio capable to record audio information. The audio adapter 700 may be mounted to the camera 70 via attachment to the tripod socket 73 of the camera. Screw 733 is used to fixedly secure the adapter 700 to the camera body 70. The audio adapter 700 may include a motor drive unit as well so as to furnish more than just one function, and may be in electrical communications with the camera 70 via the motor drive connectors of the camera. The adapter includes controls 744 used to set and to operate it in its various functional modes. The adapter also includes a microphone (not shown) for inputting acoustic information. Audio information may be saved by the adapter using any of the several methods already mentioned above: i.e. on magnetic tape, magnetic disk, optical disc, optical tape, or semiconductor memory, etc. The audio data retained by the adapter 700 may be output to a data strip recorder 140 via a cabled connection to the recorder (as illustrated in FIG. 5). The adapter itself may also be capable of generating data strips 5 in some embodiments of adapters 700. When this is the case a data strip recorder 140 may not be required. The audio adapter may also, in other embodiments, attach itself onto the flash hotshoe connector 75 of an ordinary camera. In still other embodiments, the audio adapter may even take the form of a camera "DataBack". In the DataBack embodiment, the electronic signals representative of audio data may even be written directly onto the photographic emulsion by, for example, a semiconductor laser included in the DataBack. As with cameras constructed intentionally for Sound Photography, the DataBack adapter affords the widest set of options with respect to data storage possibilities. DataBack Adapters may also employ electronic data storage media such as magnetic media, optical media, or semiconductor RAM for the temporary storage of audio information.

Figure 7:
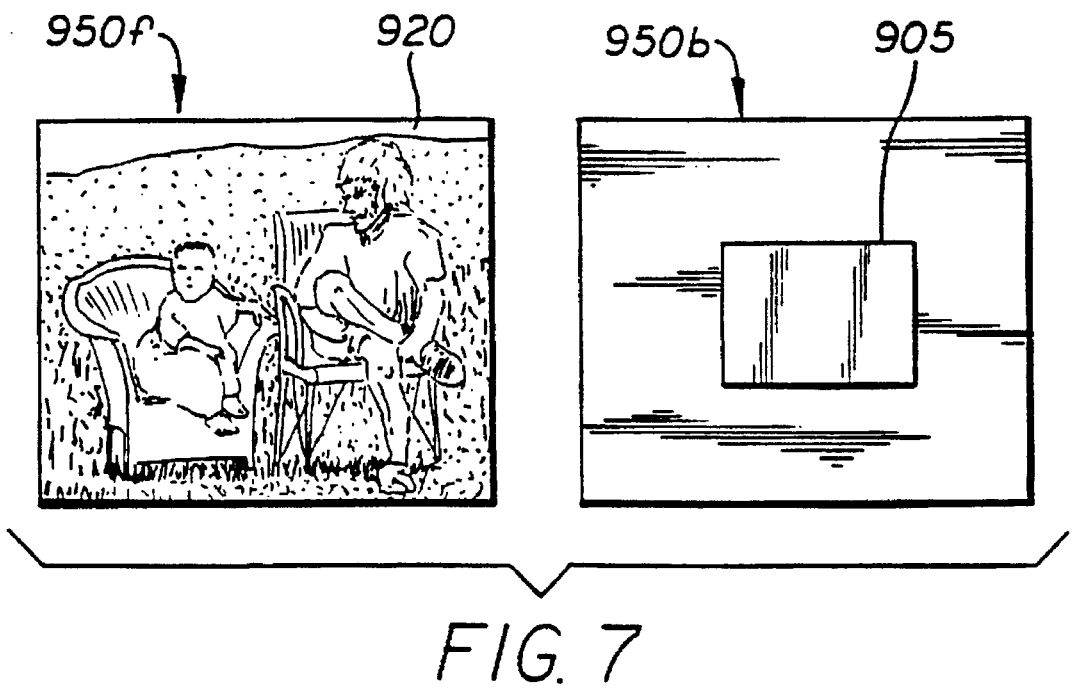
FIG. 7 shows an example of a photographic print that includes a data patch for retaining at least audio information.

FIG. 7 illustrates a photographic print that conforms with one embodiment of the present invention with respect to inclusion of audio information. In FIG. 7, 950f denotes the front, or emulsion side of the print, and 950b denotes the back side of the print. 920 represents the photographic image. On the rear face of the print, 950b, is a data patch 905. The data patch 905 is analogous to the data strip 5. It may similarly include a magnetic recording material like that used in magnetic storage tape; or be comprised of an optical recording medium, a semiconductor memory, etc.

Figure 8:
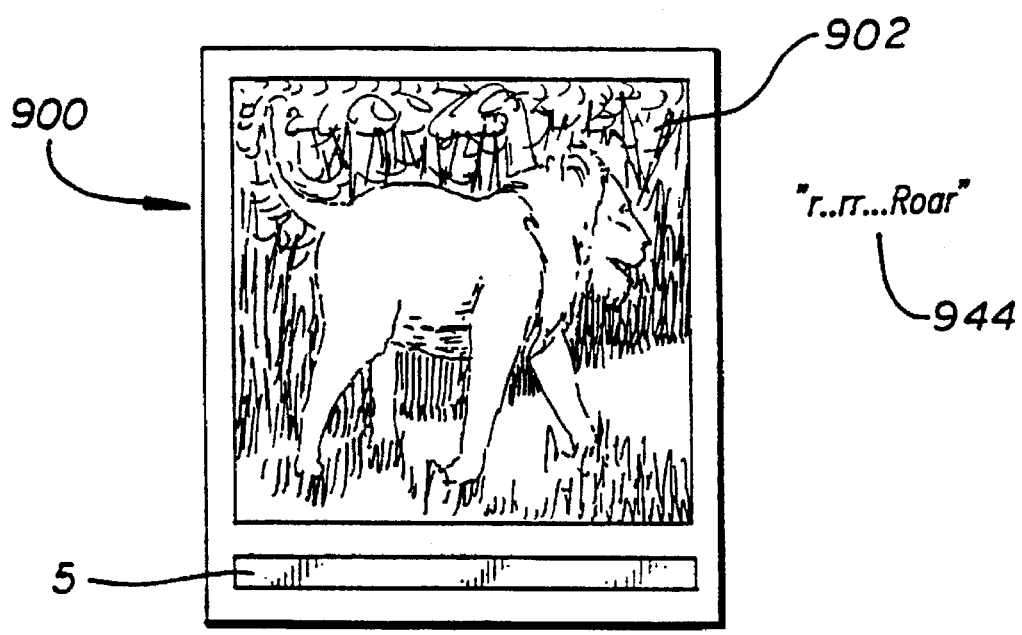
FIG. 8 shows an example of a Polaroid print that includes data storage means for retaining electronic signals representative of at least audio information.

FIG. 8 illustrates a Polaroid photographic print that has been provided with a data strip in accordance with the present invention to enable incorporation of sound into the otherwise conventional Polaroid plate. The Polaroid print 900 includes the image 902 of a lion. A data strip 5 contains the audio passage 944: "r ... rr ... Roar! " In this example, the image of the lion was captured by an acoustically triggered exposure sequence; hence the origin of the audio passage. With acoustically triggered exposures the input and recorded audio passage also initiates the photographic exposure sequence. This results in a photograph that is in synchrony with its associated audio passage.

Figure 9A:
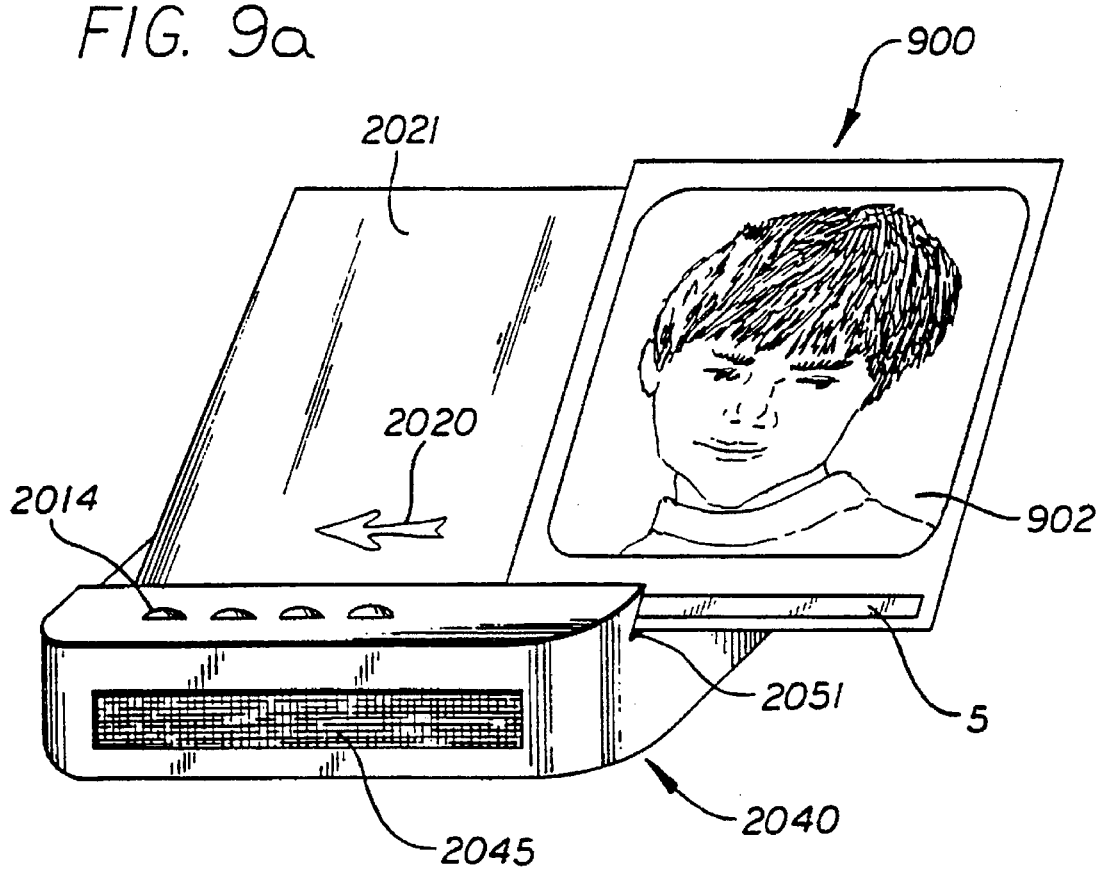
FIG. 9 shows an example of a Polaroid print "Player".

FIG. 9a illustrates a Polaroid print "Player" 2040 used for playing Polaroid prints 900. The Audio Data Strip 5 located along the bottom margin on the face of the print 900 contains the electronic signals that represent audio information. In the illustration, 902 represents the photographic image. 2021 depicts a mechanical support member provided on the player 2040 to serve as a stand for prints such as 900. When a Polaroid print is inserted into a groove 2051 situated on the right side of the player 2040, a transport mechanism included in the groove causes the print to be loaded into the player in the direction of the arrow 2020. As the print is being drawn into the player 2040, the data strip 5 travels beneath a Read Head 2060. This results in access of the electronic information contained in the strip 5 by the playing apparatus 2040. A loudspeaker 2045 is supplied for aurally reproducing the audio information retrieved from the strip 5. Control buttons 2014 are used for accessing the various functions associated with operation of the Player, such as "Play", "Pause", "Repeat", etc. The controls are analogous to some of those included with ordinary audio equipment.

Figure 9B:
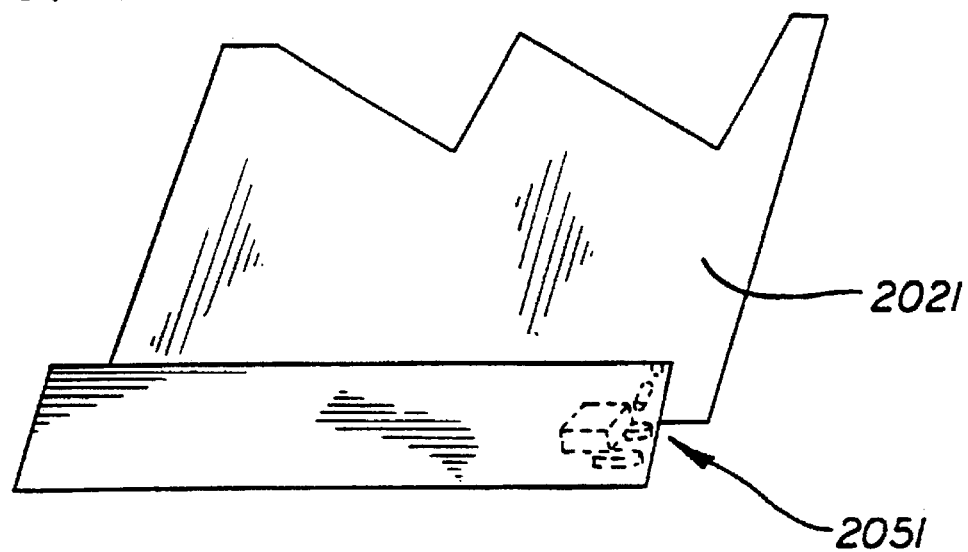
Figure 9C:
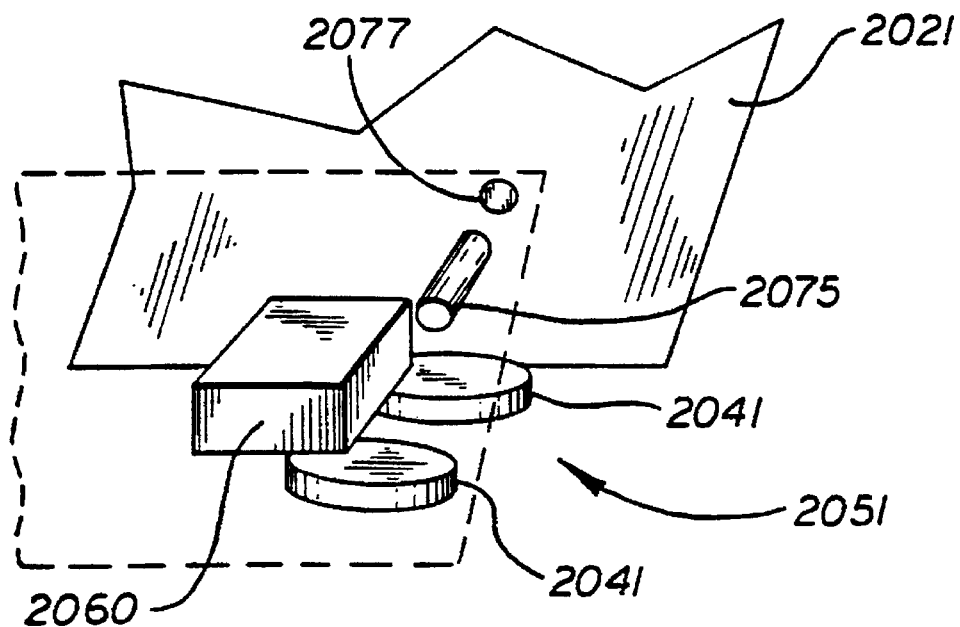

FIG. 9b illustrates some of the components present in the groove 2051 of player 2040. A portion of the "print stand", or supporting member 2051, is shown for reference. FIG. 9c is an enlargement of the portion of the groove which contains the feed mechanism and Read Head. In FIG. 9c are shown a light emitting diode 2075, and a photodetector 2077 used for detecting the light emitted by the diode 2075. When a print 900 is inserted into the groove 2051, the light path from the LED 2075 to the photodetector 2077 is interrupted. This causes a motor (not shown) to be switched on which in turn causes the rollers 2041 to draw the Polaroid print 900 into the playing apparatus 2040. As the print 900 is being drawn leftward into the player 2040, the Data Strip 5 found on the bottom margin of the Polaroid print passes under the Read Head 2060. As the strip 5 traverses the head 2060 the electronic information contained in the strip 5 is input into the playing apparatus 2040. This information may then be reproduced, for instance, using loudspeaker 2045. The Read Head 2060 may be an electromagnetic Read Head similar to those found in audio tape recorders, in embodiments where the data strip is composed of a magnetic medium similar to magnetic audio tape. In embodiments where the data strip is comprised of an optical medium, the Read Head may be an optical read head similar to those employed in, for example, compact disc players.

Figure 10:
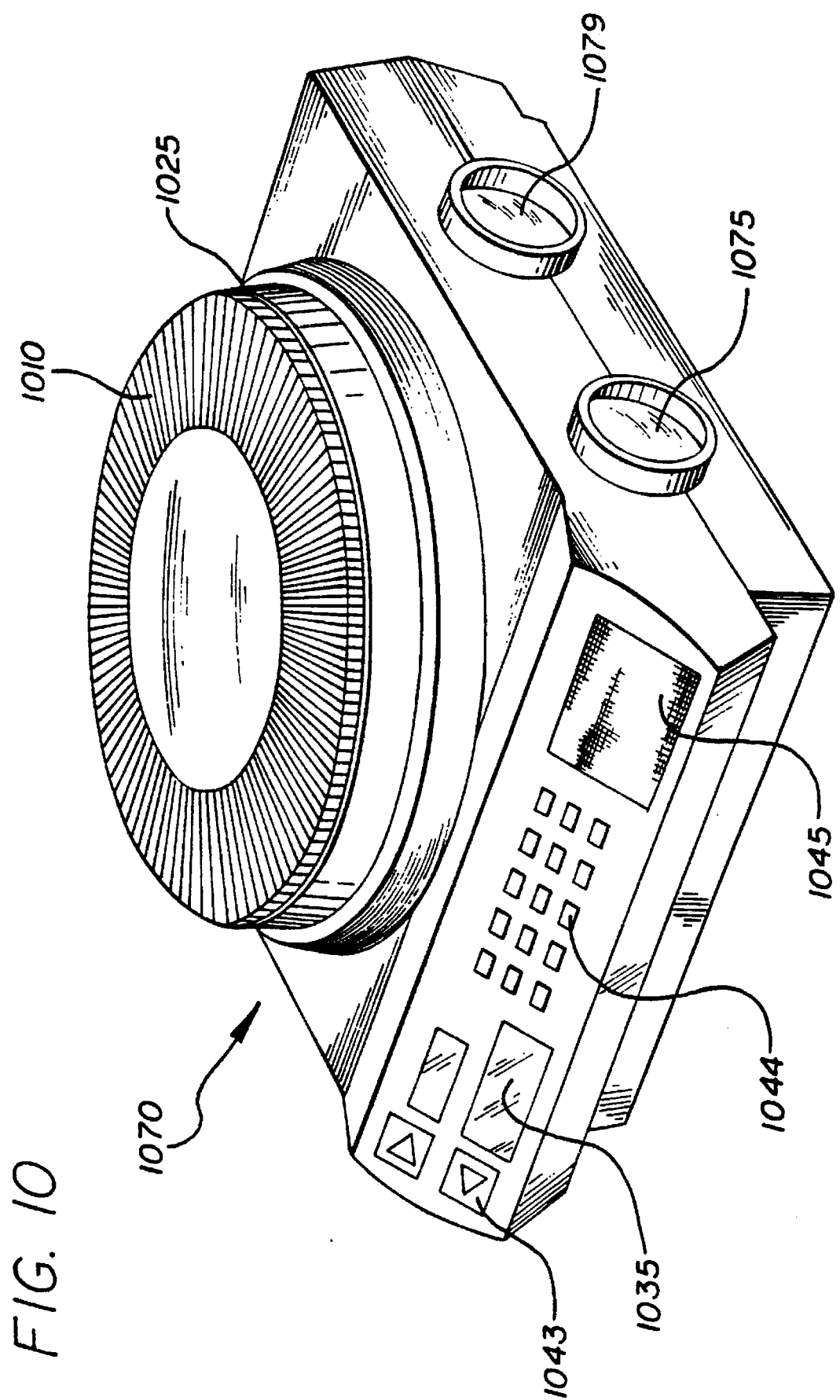
FIG. 10 shows an example of a carousel slide projector constructed to give "Multimedia-Slide" presentations.

FIG. 10 illustrates one embodiment of a carousel-type slide projector fashioned in accordance with the present invention. Not only is the projector 1070 capable of "playing" slides furnished with the data strips typical of the present invention, but it also capable of projecting conventional slides and of giving slide-based multimedia presentations as well. In the embodiment illustrated in FIG. 10, the projector 1070 includes two projection lenses: 1075 and 1079. While mono-lens embodiments are possible, a dual-lens construction will be used to illustrate the concepts involved. In the diagram, the lens 1075 represents a conventional slide projection lens. Lens 1075 is used to project the photographic images of slides 1010 present in the slide carousel 1025. Lens 1079 comprises part of an electronic image forming assembly that includes, in the present embodiment, a liquid crystal image forming element. Although any of a variety of electronic image forming techniques known in the art of image display and projection may be employed, an LCD light valve is used in this embodiment of projector 1070. The images that emerge from lenses 1075 and 1079 may be caused to converge upon a screen onto which the images may be projected, so that the two mutually independent sets of images may be superimposed. In this fashion, images of electronic origin, arising from instructions and data contained in, for example, a data strip 5 of a slide, may be superimposed onto images of the ordinary photographic variety. Audio information may be additionally included with any electronic images present and may be aurally reproduced by loudspeaker 1045. The projector 1070 includes controls 1043 for mechanically controlling and optically adjusting the conventional photographic projection aspects of the apparatus. It also includes multimedia controls 1044 for operation of the electronic presentation portions of the device. An operator's display console 1035 is provided to furnish the user interface with the projector 1070.

Figure 11:
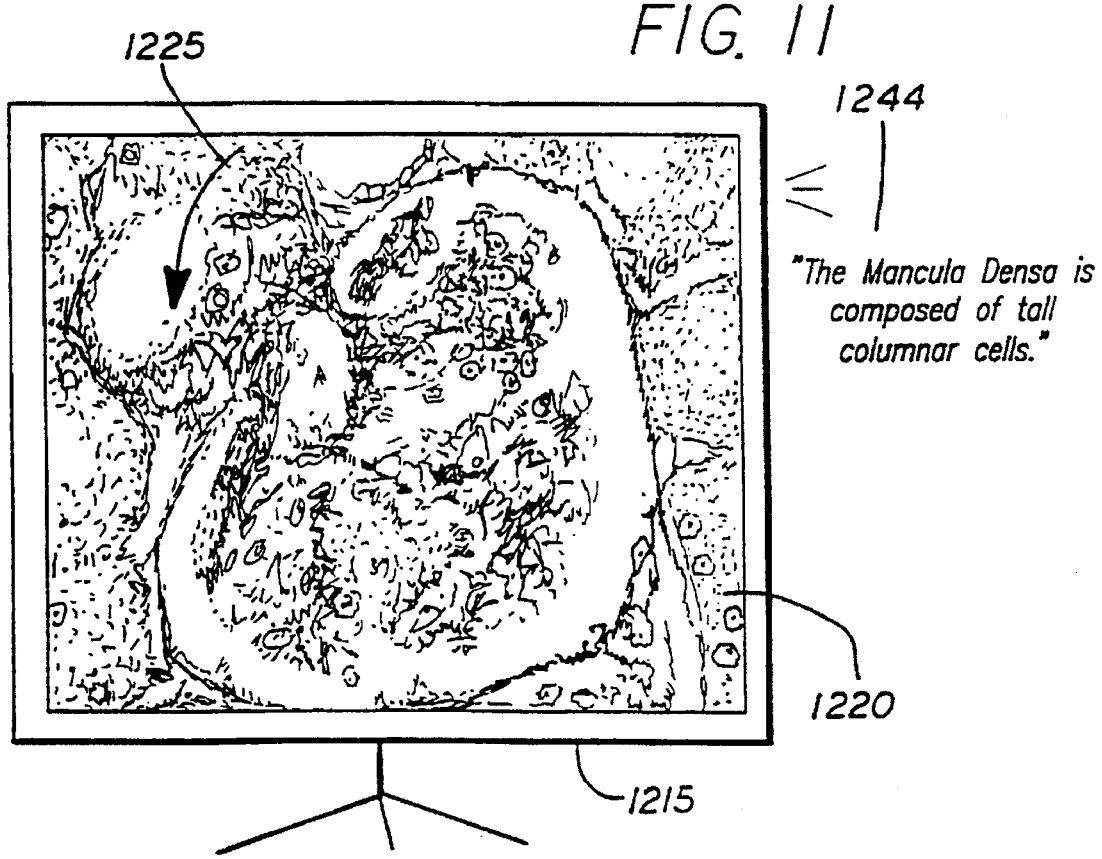
FIG. 11 shows an example of a "Multimedia-Slide" presentation enabled by the projector of FIG. 10.

FIG. 11 illustrates a very elementary form of multimedia presentation afforded by the projector and slides of the present invention. In FIG. 11, 1215 is a projection screen onto which optical images may be projected. 1220 is the projected photographic image of a slide located in the slide carousel 1025 of the projector 1070 (shown in FIG. 10). Image 1220 being of photographic origin, emerges from lens 1075 of the projector 1070. In contrast the arrow 1215, which is also projected onto screen 1215, is of electronic origin. It emerges from lens 1079 of the projector 1070 (of FIG. 10). Arrow 1225 is generated by an LCD image forming element included in the projector 1070 (not shown) from electronic signals that code for the graphical representation of an arrow. Whereas the image 1220 is of a "static" nature, the arrow 1225 may be "dynamic". That is, the arrow may move about on the screen 1215 so as to point to different parts of its co-projected, photographic image. In the example in FIG. 11, the dynamic arrow 1225 is also accompanied by an audio component 1244. The audio component in the illustration is narrating a slide show on Histology. In embodiments where the data strip 5 is comprised of an optical memory, more elaborate images and audio narratives than the one depicted in FIG. 11 may be afforded— including, for instance, presentations that include superimposed video frames and computer animations. Indeed the audio information may even be of a synthetic nature in that phonemes, symbols, or mere words may be stored in data strips and a computer may be included to synthesize speech from these elements. It is also possible for automated slide shows and multimedia presentations to be given by the slides themselves, the control instructions for these presentations being contained in the data storage media of the slides.

To increase the amount of electronic information that may be incorporated into a multimedia slide show, some embodiments may employ slide configurations wherein "Data Slides" alternate with photographic slides in carousel slots. For example, slides one, three, five, seven, etc. may be "Data Slides"; and slides two, four, six, eight, etc. may be photographic slides. "Data Slides" may be comprised of electronic data storage media having physical dimensions substantially the same as ordinary photographic slides. After the information contained in a "Data Slide" has been read into memory by the projector, the photographic image associated with the subsequent slide in the carousel tray, which may be a photographic slide, may be projected. Electronic images, pointers, audio passages, video pictures, A/V sequences, computer animations, etc. may then be played, displayed or projected in concert with ordinary photographic images. A multimedia slide projector may also be capable of controlling other equipment, such as audio components, video components, computers, etc. to which the projector may be connected.

Figure 12:
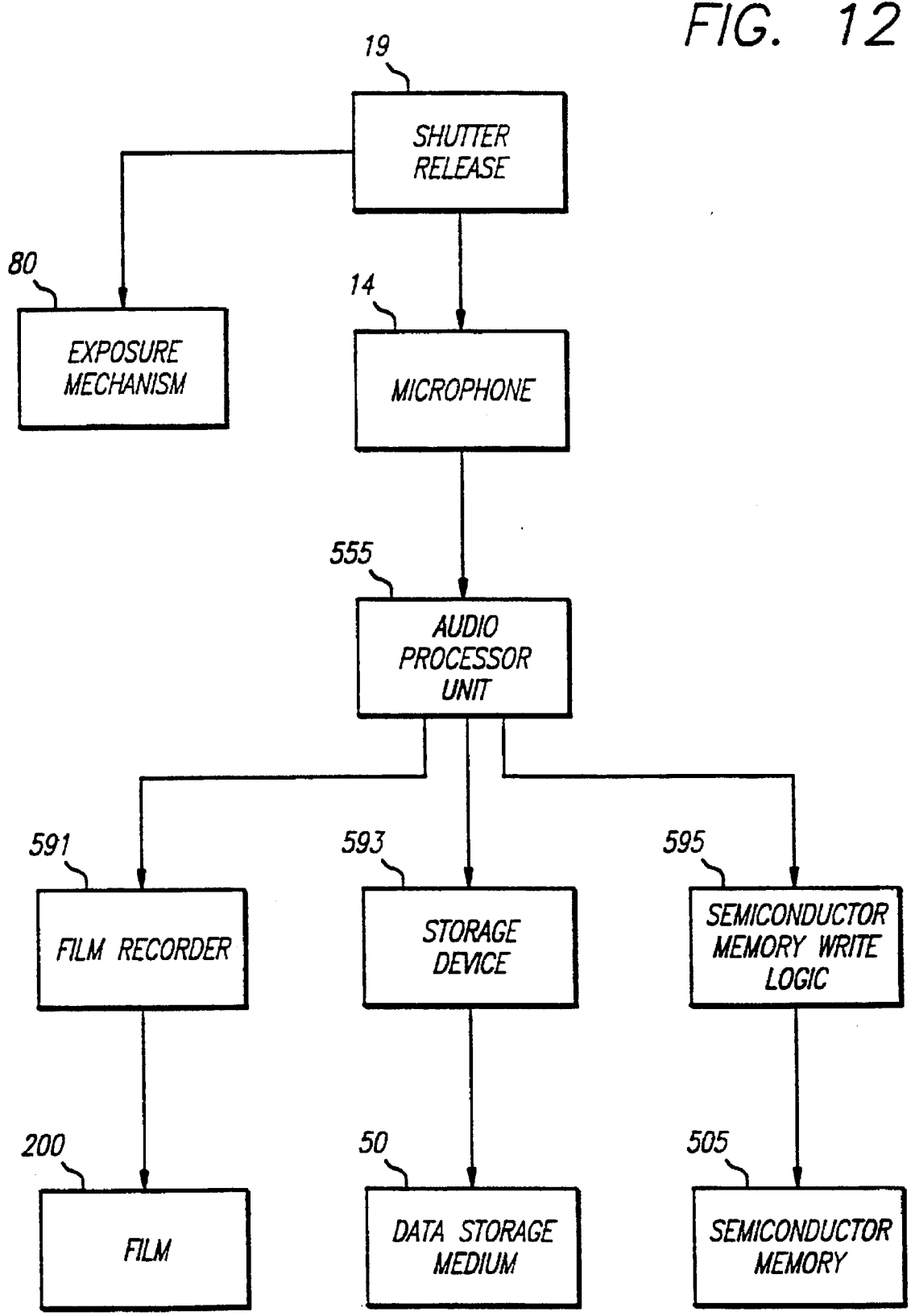
FIG. 12 shows an example of an abbreviated schematic of a camera constructed for still film Sound Photography.

FIG. 12 is an abbreviated schematic that shows the relationship of a camera constructed for Sound Photography to one of the conventional art. Both types of cameras include a shutter release button 19 and an exposure mechanism 80. In both cases depression of the shutter release button 19 causes the exposure mechanism 80 to allow a photographic image to be formed on film 200. The darkened boxes represent components which are additionally included in cameras constructed in accordance with the present invention. Among these is 14, which is a microphone for inputting audio information. The audio information input by the microphone 14 goes to 555 where it is processed into a format amenable to storage. The output from the Audio Processor Unit 555 comprises electronic data representative of audio information; which may be saved in a variety of different storage media. The precise set of components used to implement storage will depend on the particular choice of medium actually selected to furnish the storage. Three candidate storage media are presented for illustrative purposes in FIG. 12. One method uses a film recorder 591 to save the electronic signals in the form of optically encoded variations in light on the photographic emulsion 200. Methods for accomplishing this are well known in the art. They include techniques wherein a laser, such as a semiconductor laser, may be used to "expose" substantially minute portions of the film surface with spots or stripes of varying intensity. The variations in optical density in the film may serve to encode information. Another applicable technique involves recording the signals representative of at least audio information in a data storage medium such as 50, which may be a tape, disk, memory card, etc. of either the magnetic, optical, or another variety. The data storage media mentioned above may serve to provide a temporary place for keeping the audio information, until such time that the information may be transferred to Data Strips 5. The specific type of storage device 593 used to place the data into the data storage medium 50 would depend on the particular storage medium involved. For instance, if the storage medium comprises a magnetic tape, the storage device may include a tape recording mechanism comparable to ones employed by ordinary audio tape recording apparatus. If the storage medium utilizes a magnetic disc, the storage device may include a disk drive such as, for example, a micro-drive perhaps conforming to the 1.3-inch form factor currently emerging in many sub-notebook computers. The electronic data representative of at least audio information may also be stored in a semiconductor memory such as a RAM. If the storage medium comprises a semiconductor RAM, then Write Logic 595 may be included in order to permit the data to be written into the semiconductor memory 505. There are numerous storage technologies available in the art which may be applicable to the information storage needs of the present invention. The choice as to which particular technology would best serve the requirements of any particular embodiment of the invention would be recognized by skilled artisans.

Figure 13A:
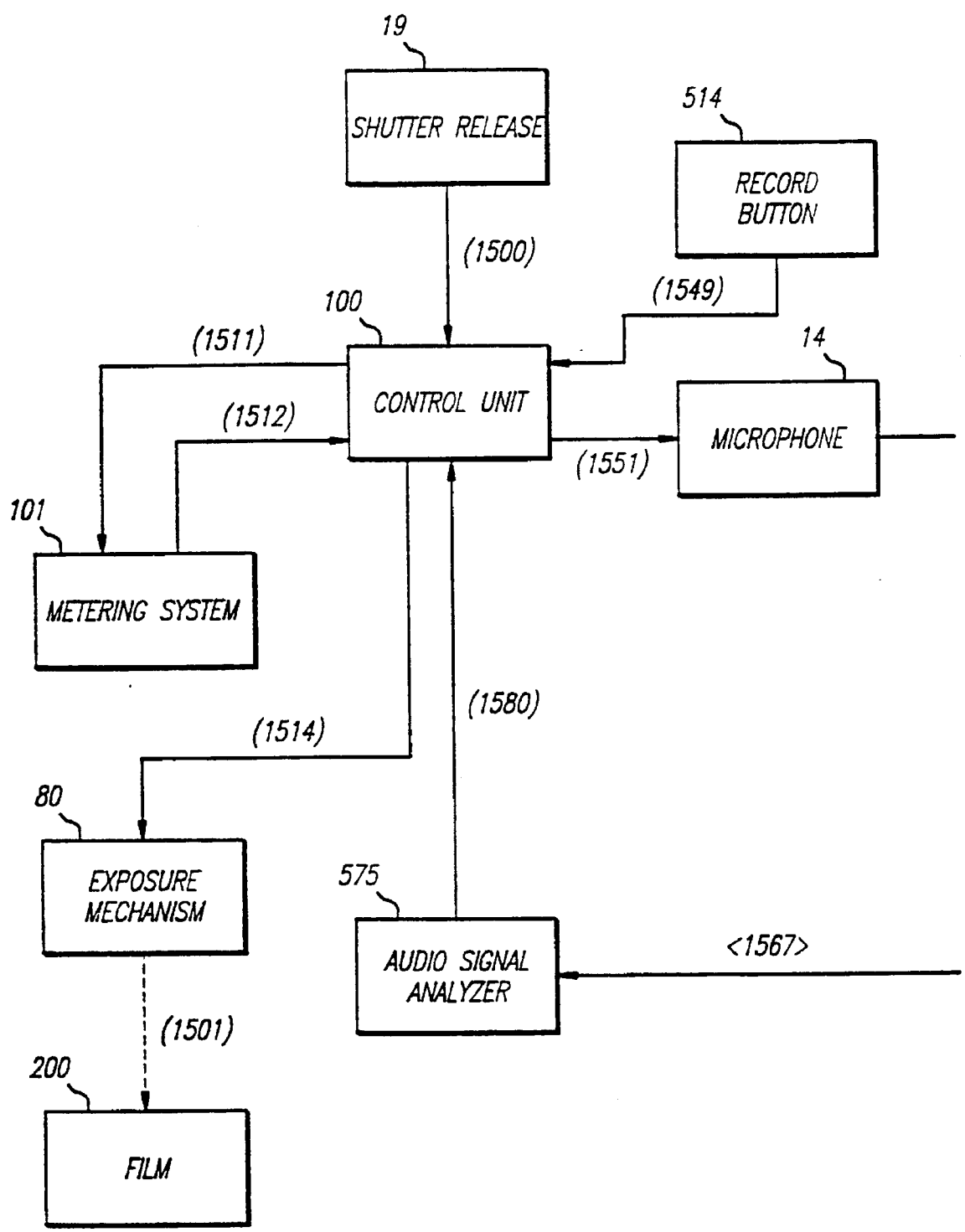
FIG. 13 shows an example of a still film sound photography system.
Figure 13B:
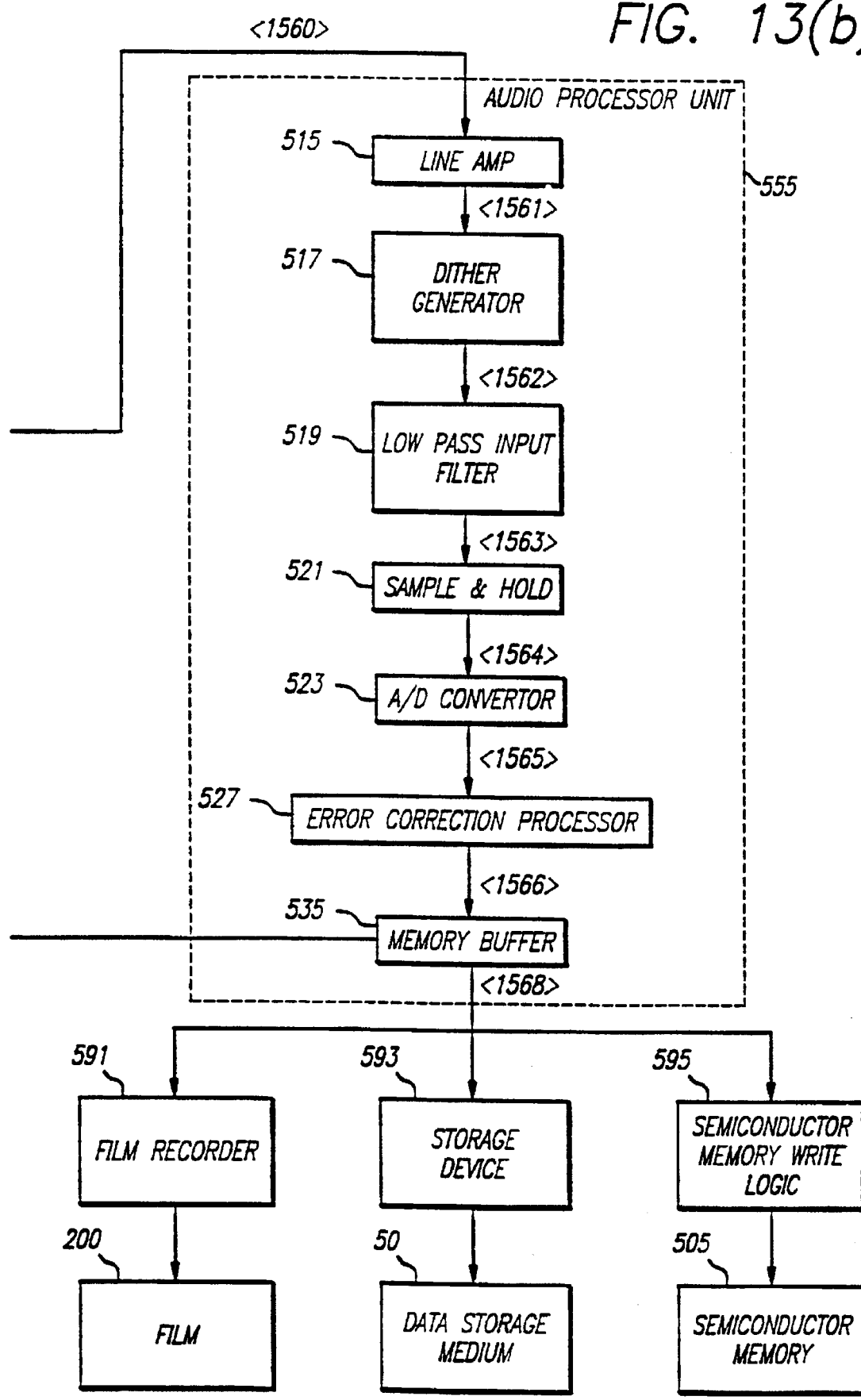

FIG. 13 is a diagram illustrating one embodiment the still film sound photography system of the present invention. The illustration shown is for an implementation in which the signals are stored in digital format. While the electronic signals representing audio information may be saved with comparable facility in analog format, whether on film 200 or in a data storage medium 50, the digital format permits storage in a semiconductor memory such as 505. Because the cost of semiconductor memory is decreasing steadily, while its storage capacity is continuing to rise, implementations involving such memories are quite attractive. FIG. 13 thus uses as an example a camera capable of employing a semiconductor memory for the retention of electronic signals.

Cameras of the present invention permit a large number of different "shooting" modes, some of which will now be discussed in connection with FIG. 13.

One mode of taking a still photograph that includes sound involves initiating sound recording simultaneously with the initiation of an exposure sequence. This begins with the depression of Shutter Release button 19. This event signals (1500) the Camera Control Unit 100 to activate (1511) the metering system 101 so that light measurements may commence. The metering system 101 sends light measurement and focusing information (1512) to the camera control unit 100 which may be used for calculating focus, aperture opening, shutter speed, etc. In embodiments of cameras that employ "Through-The-Lens" metering, the data stream (1512) may comprise a continuous stream. Using the information (1512) supplied by the metering system 101, the control unit 100 controls (1514) the exposure mechanism 80 to allow an optical image to be captured (1501) onto the film 200. Concurrent with the just-described steps which produce a photographic image, depression of the shutter release button 19 also causes the control unit 100 to activate (1551) the microphone 14. The switched-on microphone 14 sends a time-continuous data stream comprised of analog electrical signals representative of audio data <1560> to the Audio Processor Unit 555. The analog electrical audio signals are amplified by Line Amplifier 515. The amplified signal passes to a Dither Generator 517 to improve resolution and to lower distortion. Dither is an analog noise signal that is intentionally added prior to sampling to randomize the effects of quantization error. There are many kinds of Dither signals which may be employed. For example, they may be signals with: rectangular, triangular, Gaussian, etc. probability density functions. Dither Generator 517 may even be excluded from some embodiments since the analog noise inherent in amplifier 515 as well as in the Low Pass Filter 519 may provide an adequate dither signal for the present purposes. The preceding concepts are appreciable to audio engineers. The dithered analog signal <1562> is presented to a Low Pass Filter 519 to band-limit the signal to frequencies below half the sampling frequency. Filter 519 should have a very sharp cutoff, whose actual frequency would depend on the particular sampling frequency employed by the system. Most embodiments will employ input filters 519 with a cutoff set at, or below, 22 kHz. The frequency response within the passband and cutoff band should be flat. The Sample and Hold circuit 521 is a standard device element preceding the A/D Converter 523. It serves the role of sampling the analog waveform <1553> at a periodic rate, and of holding the analog value of the sample <1564> until A/D Converter 523 has output a digital word <1565> that represents the value of the sample. The science of Analog-to-Digital Conversion is a mature technical art that is well known in the field of electrical engineering. Error correction, a requirement common to digital recording and familiar to all computer engineers, takes place at 527. A familiar example of error correction would be the addition of parity bits. After error correction has been applied to the stream of digital data <1565>, the processed digital data <1566> is stored in a memory buffer unit 535.

The digital data representative of audio information may be saved in any of a variety of storage media. As discussed above these may include: film 200, an electronic data or audio/video signal storage medium 50, a semiconductor memory 505, etc. The steps of formatting, record modulation, and recording may be supplied by the storage device interface hardware of the particular storage device involved.

One embodiment of a camera "shooting" mode was described above wherein sound recording commenced with initiation of a photographic exposure sequence, following depression of the shutter release button 19. In another mode of operation, sound may serve as the "trigger" mechanism for the initiation of the exposure sequence. Sound may thus substitute for the shutter release button 19. In this category of exposure initiation, data representative of acoustic information is relayed <1567> to an Audio Signal Analyzer 575. The Signal Analyzer 575 may include its own microprocessor, RAM, ROM and Digital Signal Processing hardware, depending on the complexity of the embodiment. In simple embodiments the signal analyzer may merely comprise a register for holding a digital reference word representative of an amplitude level, another register for holding the data word corresponding to the current position in the incoming audio waveform, and (for example) subtraction circuitry for comparing the values contained in the two registers. When the sound level exceeds a preset level, the Signal Analyzer 575 may signal (1580) the Camera Control Unit 100 to initiate the exposure sequence. The control unit 100 may simultaneously initiate storage of the audio information input by microphone 14 in, for instance, medium: 200, 50, or 505.

In another embodiment of a camera "shooting" mode the Audio Analyzer 575 may be capable of detecting preprogrammed acoustic patterns. For example, an acoustic pattern match may be used to initiate an exposure and sound recording sequence. Commands such as "Go" or "Ready" may comprise possible acoustic patterns to be matched. Acoustic pattern matching protects against erroneous pictures being taken due to unexpected loud background sounds. A specific photographer's voice signature or speech pattern may also comprise the pattern to be matched. Voice signatures may be stored in, for example, a nonvolatile memory block within the analyzer unit 575. A wide range of remotely activated functions may be afforded based upon spoken commands. Some examples might be: "Zoom-in" or "Wide Angle", "Fill Flash", or "No-Red-Eye". The Audio Analyzer Unit 575 may include DSP (Digital Signal Processing) circuitry in embodiments capable of performing acoustic pattern matching.

Another embodiment of a camera "shooting" mode makes use of a Record Button 514 shown in FIG. 13. The record button 514 may be used to record audio passages out of synchrony with photographic exposures. Whether before or after an exposure has been made, although typically after, a photographer may dictate into microphone 19 of camera 7 an audio message. As an example, a photographer might dictate the names of the people contained in a photograph, after the photograph has just been taken. The record button 514 may also be used to enter audio information, such as a memo, into RAM 505. An example might be: "Remember to shoot picture of Eiffel Tower." The record button 514 is comparable to the record start button of an ordinary audio tape recorder.

FIG. 14 shows a camera with the film back removed to reveal a number of internal components. A canister of film 60 is present with a segment of photographic film 200 emerging from the canister. In the normal operation of the camera, film 200 will be threaded onto take-up reel 87; and, with each successive "shot" film 200 Will advance in the direction of the arrow 89 towards and onto take-up reel 87. The optical write head of a semiconductor laser assembly is depicted in FIG. 14 as 817. 817 is used to place the parallel tracks of optically encoded data 25 onto film 200 as the film traverses assembly 817 on its way to the take-up reel 87.

Modulations in spot intensity within each of the parallel tracks may be employed in writing information to the photographic emulsion. A data frame such as 22 of FIG. 2a may be formed in this manner. Also illustrated in FIG. 14 is a magnetic recording head 851 used to write data onto a data patch 55 provided in association with a film canister 60. The recording head 861 is included with the camera back, which was removed in the figure for purposes of illustration. Magnetic recording head 861 may be similar to recording heads used by many audio devices for storing signals onto magnetic tape. It may also be similar to recording heads employed by devices such as micro magnetic disc drives. Whereas the data patch depicted in FIG. 14 is of the magnetic variety, as discussed earlier, it may also be of the optical variety, etc. Similarly, the data patch may comprise a semiconductor memory. The actual type of write head employed, though shown here as 961, may depend on the selection of storage medium to be used by the data patch 55. The examples provided are therefore to be regarded as illustrative of the concepts involved, rather than limiting. In FIG. 14, the data patch 55 also includes a "markup" region 56 so that identifying information or comments may be hand written onto the patch. Arrows 863x and 863y denote the tracking directions in which the recording head 861 may take.

Figure 15:
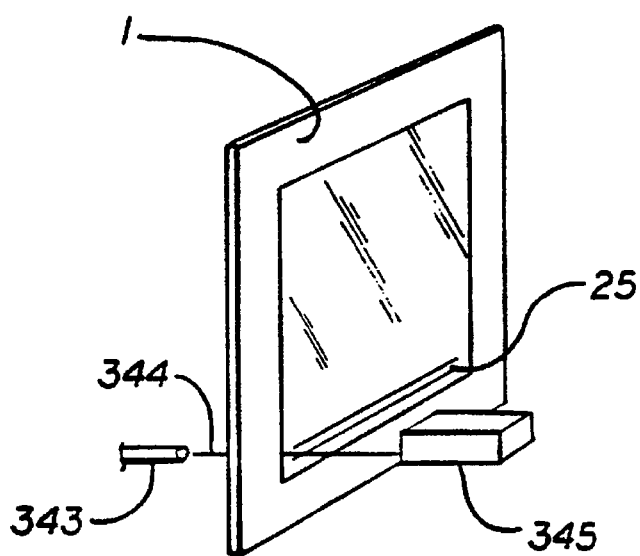
FIG. 15 shows an example of a process for reading optical data included in the film of a photographic slide.

FIG. 15 illustrates one embodiment of a process for reading data contained optically in a slide. The slide 1 may be the developed result of a negative such as 2Nx or any of FIG. 2a. A light source such as a laser 343 may be employed to access the data in tracks 25 which are present in the photographic emulsion. The beam 344 emanating from its source 343 is modulated by the variations in optical conductivity of the track 25 where the beam traverses the film. A photodetector 345 detects the light of the beam emergent from the slide. The variations in light intensity seen by photodetector 345 may be used to modulate an electrical signal. The technique involved is known in the art and would be appreciated by skilled artisans. The information thus obtained from the slide may then be used in any of the ways previously described in this disclosure. For instance, it may be transferred to a data strip (though this is not a requirement). The procedure illustrated in FIG. 15 may be practiced by the photographic developer, in order to generate a data strip for an amateur photographer's slide; or, it may be practiced through incorporation into an apparatus such as the recording unit 140 of FIG. 5. It may also be practiced by a slide player or projector.

One of the advantageous features of applicant's invention is that it is fully compatible with existing, non-audio still film cameras. In fact, for all the embodiments disclosed herein, applicant's invention is intended to be an optional feature available to the user "on-demand." Unlike prior art systems, the user need not decide to record any audio information for a photograph until after the photograph is taken. In addition, because frames of film are not pre-allocated for either a photographic image or audio information, no film is wasted if no audio is recorded with a particular photograph. In the embodiment illustrated in FIG. 2a, for example, where an audio frame associated with a photographic image is shown in the frame immediately following the frame containing the image, the audio frame would instead contain another photographic image if no audio information were desired for the previous image.

FIG. 16(a) illustrates one embodiment of applicant's invention and shows a filmstrip 5000 containing a plurality of picture frames 5010, 5015, 5025, and 5030, and one sound frame 5020. The sound frame 5020 depicted is adjacent to, and immediately follows its associated picture frame, which is to the left of 5020. (The direction of film transport in FIGS. 16(a-c) is toward the left.) FIG. 16(a) illustrates how the "Sound-On-Demand" capability of the still film apparatus taught herein permits any unexposed photographic frame to serve as either a picture frame or a sound frame, thereby, in addition to to other benefits, conserving film. Furthermore, while the default position of sound frames is adjacent to and immediately following their associated picture frames, relative to the direction the film is transported in following its exposure, this is not mandatory. The spatial relationship of sound frames to their associated picture frames may be variable, rather than fixed, within any given strip of film. Thus, a sound frame may immediately follow in some instances, or be located any number of frames away in other instances. Another characteristic of the "Sound-On-Demand" feature is that not every picture frame has to have sound associated with it. As illustrated in FIG. 16(a), as no sound was desired for picture frames 5010 and 5025, the frames immediately following these images also contain pictures. Therefore, where no sound is to be recorded for a particular image, such as where the user does not depress record button 514 or otherwise cause sound recording to occur, the apparatus of the present invention functions as an ordinary still film camera and exposes the frame following a picture frame to another photographic image. Also, it is possible for some picture frames to have a plurality of associated sound frames, rather than just one.

Figure 16B:
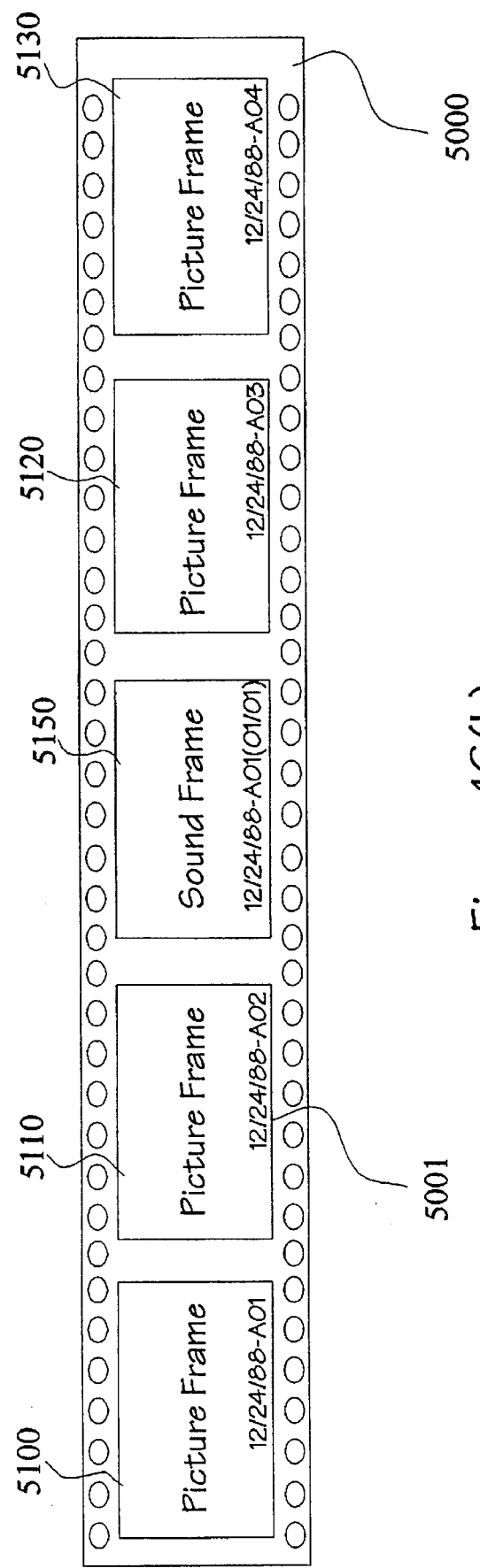

FIG. 16(b) shows a film strip in which each frame (picture & sound) possesses an identifier 5001. The identifier 5001 permits sound frames to be functionally maintained with their associated picture frames as developed slides or prints, even if the developed deck should become shuffled. In FIG. 16(b) the sound frame 5150 is associated with the picture frame 5100. The picture frame 5110, rather than 5150, follows frame 5100 because the photographer wanted to capture two successive images in rapid succession. If she had to wait until after a sound frame had been written before being able to capture another image onto a picture frame, this would not have been possible. This present invention therefore permits multi-frame stop-action photography to practiced in conjunction with a still film sound apparatus. It further permits stop-action photography to be executed without significant departure from customary practice, and with minimal modification to existing still film cameras. As described in connection with FIG. 6, a databack adapter may be mounted onto a conventional camera to write sound data onto film, including the identifiers 5001. In that embodiment, no modification to the design of an existing camera would be required at all.

In FIG. 16(b) the convention used to generate labels 5001 for frames is as follows. For picture frames: "<Date>- <Film Roll ID><Picture Frame #>." For example: "Dec. 24, 1988-A03" denotes a picture taken on Christmas Eve 1988 , a first roll on that day (hence "A"), and a third image (hence "03">. For sound frames the convention is: "<Date>-<Film Roll ID><Associated Picture Frame #>(<Present Sound Frame #>/<Total # Sound Frames Possessed by the Associated Picture Frame>". For example: "Dec. 24, 1988-B02(02/03)" denotes a sound frame created on Christmas Eve 1988, on a second roll of film used that day (hence "B"), associated with the second picture image taken on that roll (hence "02"), and is the second sound frame of three sound frames created in association with that picture image (hence "02/03").

Figure 16C:
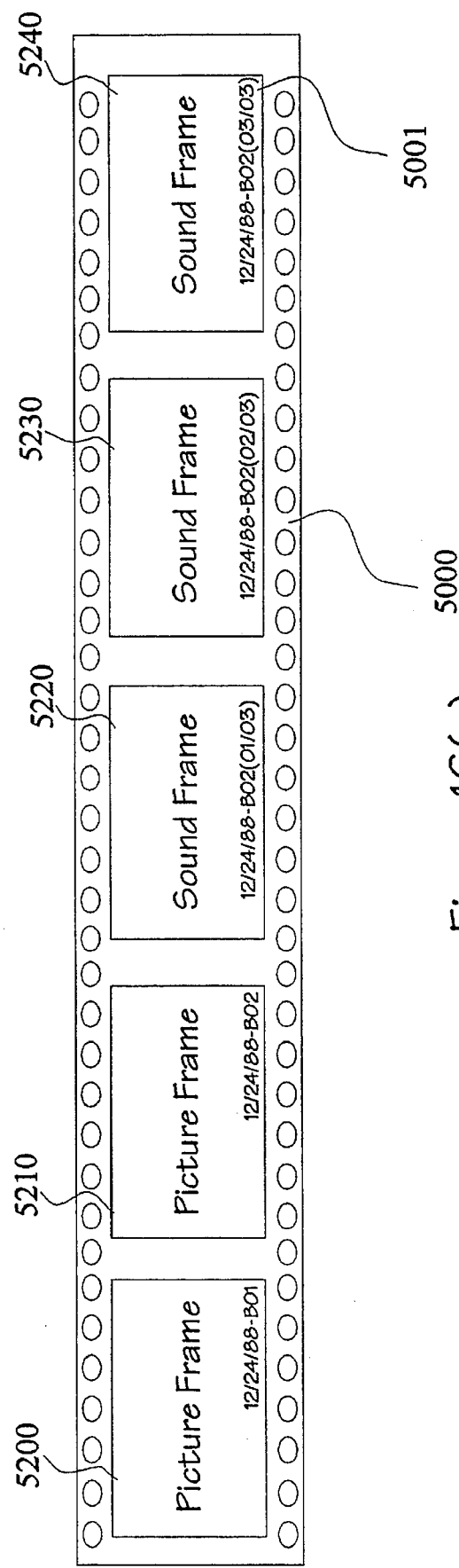

FIG. 16(c) shows a film strip 5000 containing a picture frame 5200 which does not have any sound information associated with it. Another picture frame 5210, in contrast, has three sound frames: 5220, 5230, and 5240. The "Sound-On-Demand" capability of the present invention permits any frame of film to serve as either a picture frame or a sound frame, "on demand" by the photographer. As illustrated in FIG. 16(c) a plurality of sound frames may accompany a picture frame. The reverse situation, where a plurality of picture frames accompany a sound frame, is also possible, but is not shown.

Figure 17:
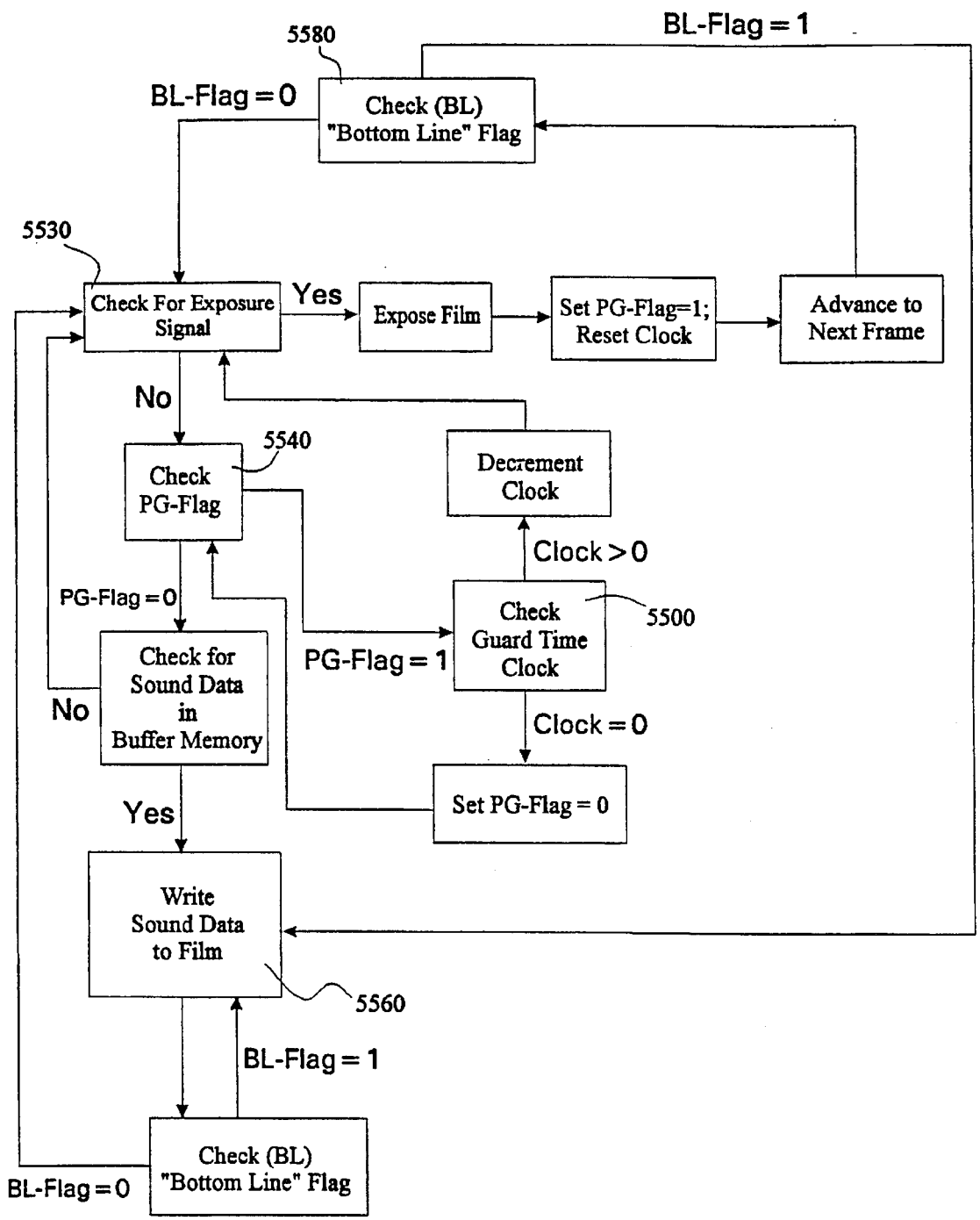
FIG. 17 is a flow diagram illustrating the operation of one embodiment of applicant's invention.

Another feature of the present invention, referred to herein as "Picture-Guard," is illustrated in the flow diagram of FIG. 17. The Picture-Guard feature is a benefit of the Sound-On-Demand feature—it maintains the still film apparatus of the present invention in a "picture-ready" state, ready to capture photographic images, as is customary practice with existing still film cameras having motorized film transport mechanisms. The Picture-Guard feature may be explained with reference to FIG. 14, where optical write means 817 (which may be, but does not have to be a semiconductor laser array) is shown disposed on the "downstream side" of the camera lens with respect to the direction the film is transported through the camera as it is exposed. The reason for placement of the optical write means in this location is to allow an unexposed frame of film to be advanced to the position behind the camera lens following a completed photographic exposure, yet still permit the frame to be ready to receive either another picture or sound information for the previous picture. In distinction, with optical write means 817 on the "upstream side" of the camera lens, an unexposed frame would have sound data written onto it before it reaches the position behind the lens. Therefore, if a frame is used for sound, it may no longer be used to contain a picture by the time it reaches the behind-the-lens position. Similarly, if an unexposed frame is transported to the behind-the-lens position so as to be ready to receive a picture image, it has by virtue of being so transported lost its opportunity to be used for sound. The location of the optical write means 817 downstream of the lens thus permits any frame to be used for either picture or sound information, without violating the practice of transporting an unexposed frame to the behind the lens position immediately following a completed exposure, so as to "be ready" to receive a photographic image. In addition to this, that same fresh unexposed frame is alternatively "ready" to receive sound information. This enables a plurality of picture frames to be created in succession and to occupy positions of the film strip immediately adjacent to each other, although one or more of those pictures may have sound data associated with them. The sound data may be held in the memory buffer 535 until shooting conditions are favorable for the recording of sound data onto the film. With a multi-frame stop-action sequence, this may (but does not have to) immediately follow completion of the sequence.

The Picture-Guard feature may also include a predetermined latency period or "Guard-Time" following a completed photographic exposure to permit a photographer to "suddenly realize" that she wishes to take another shot. Audio data will not be written until the Guard-Time has elapsed. The predetermined Guard-Time may be pre-programmed at the factory or set by the photographer. A possible Guard-Time might be a 7-second latency interval. In the embodiment illustrated in FIG. 17, when the amount of unexposed film remaining is only enough to accommodate sound frames for audio data spooled into the memory buffer unit, the "Bottom-Line" Flag (BL-Flag=1) causes camera logic to force sound data to be written to film 5560. In other embodiments, this type of forced sound-dump may optionally not be practiced. Instead, an audible warning may signal the photographer that sound data is in danger of being lost, while pictures may still be captured.

The embodiment of the disclosed invention including the Picture-Guard feature may be more fully described with reference to the flow diagram of FIG. 17. At 5530, a check is made for an exposure signal. If such a signal is detected, the film is exposed, the Picture Guard ("PG") flag is set to 1, and the Guard Time clock is reset. The film is then advanced to the next frame. At 5580, the BL-Flag is checked. If the BL-Flag is set to 1, sound data stored in the buffer memory is written to the film at 5560. If the BL-Flag is set to 0, another check is made for an exposure signal at 5530. If no exposure signal is detected, the PG-Flag is checked at 5540. If the PG-Flag is set to 1, the Guard Time clock is checked at 5500. If time still remains on the clock, it is decremented and another check is made for an exposure signal at 5530. If the clock is at 0, the PG-Flag is set to 0 and the system returns to 5540. If the PG-Flag is set to 0, a check is made for sound data in the buffer memory. If no sound data is stored in the buffer memory, the system returns to 5530. If sound data is present in the buffer memory, it is written to the film at this time. After sound data is written to the film at 5560, another check of the BF-Flag is made to determine of additional sound data must be written to the film.

The presently disclosed embodiment is therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A still film photographic system comprising:

film transport means for transporting a film strip to a take-up reel following exposure of a portion of the film strip to an image;

means for exposing a first portion of the film strip to a first photographic image;

means for receiving a user control command indicating that audio information associated with said first image is to be written to said film strip;

means for receiving audio information associated with said first photographic image in response to said user control command;

a buffer memory for temporarily storing said audio information;

optical write means for writing said audio information to a second portion of the film strip adjacent to and immediately following said first portion relative to the direction of travel of the film strip as the film strip is being transported to the take-up reel following exposure of said first portion of the film to said first image, said second portion comprising a variable number of frames, each said frame of a predetermined and fixed length; and means for exposing a first frames of said second portion of said film strip immediately adjacent said first photographic image to a second photographic image if said user control command is not received.

2. The system of claim 1 wherein said optical write means comprises a plurality of light emitting elements.

3. The system of claim 1 wherein said optical write means comprises a semiconductor laser.

4. The system of claim 1 wherein said audio information receiving means comprises a microphone.

5. The system of claim 1 wherein the audio information is received prior to exposing the film to the associated photographic image.

6. The system of claim 1 wherein the audio information is received concurrently with the exposure of the film to the associated photographic image.

7. The system of claim 1 wherein the audio information is received subsequent to exposing the film to the associated photographic image.

8. The system of claim 1 further comprising audio analyzer means for analyzing the received audio information.

9. In a still film photographic system comprising means for exposing a film strip to photographic images and film transport means for transporting the film strip to a take-up reel following exposure of a portion of the film strip to an image, a method for writing audio information to the film strip comprising:

exposing a first portion of said film strip to a first photographic image, receiving a user control command indicating that audio information associated with said, first image is to be written to said film strip, receiving audio information associated with said first photographic image, temporarily storing said audio information in a buffer memory, writing said audio information to a second portion of the film strip adjacent to and immediately following said first portion relative to the direction of travel of the film strip as the film strip is being transported to the take-up reel following exposure of said first portion of the film to said first image, said second portion comprising a variable number of frames, each said frame of a predetermined and fixed length, and exposing a first frame of said second portion of said film strip immediately adjacent said first photographic image to a second photographic image if said user control command is not received.

10. The method of claim 9 wherein a semiconductor laser is used to write the audio information to the film.

11. The method of claim 9 wherein the audio information is received subsequent to exposing the film to the associated photographic image.

* * * * *